US010176446B2

(12) United States Patent
Palmer et al.

(10) Patent No.: US 10,176,446 B2
(45) Date of Patent: *Jan. 8, 2019

(54) SYSTEM AND METHOD FOR INVENTORY MANAGEMENT, COST SAVINGS DELIVERY AND DECISION MAKING

(71) Applicant: MSC Services Corp., Melville, NY (US)

(72) Inventors: Michael Edward Palmer, Mesa, AZ (US); James Paul Goettler, Cranberry Township, PA (US); Raphael Lance Smith, Hixson, TN (US)

(73) Assignee: MSC Services Corp., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/191,159

(22) Filed: Jun. 23, 2016

(65) Prior Publication Data
US 2017/0372243 A1 Dec. 28, 2017

(51) Int. Cl.
G06Q 10/06 (2012.01)
G06Q 10/08 (2012.01)

(52) U.S. Cl.
CPC ... *G06Q 10/0637* (2013.01); *G06Q 10/06313* (2013.01); *G06Q 10/087* (2013.01)

(58) Field of Classification Search
None
See application file for complete search history.

(56) References Cited

U.S. PATENT DOCUMENTS

| 4,563,739 | A | 1/1986 | Gerpheide | |
|---|---|---|---|---|
| 4,887,207 | A | 12/1989 | Natarajan | |
| 5,983,198 | A | 11/1999 | Mowery | |
| 7,546,257 | B2 | 6/2009 | Hoffman | |
| 7,664,684 | B2 | 2/2010 | Boerner | |
| 7,725,366 | B1* | 5/2010 | Franco | G06Q 10/08 705/27.1 |
| 7,996,284 | B2 | 8/2011 | Bar | |
| 8,229,791 | B2 | 7/2012 | Bradley | |
| 8,234,186 | B2 | 7/2012 | Alba | |
| 8,494,976 | B2 | 7/2013 | Furman | |
| 8,504,406 | B2 | 8/2013 | Miller | |
| 8,571,915 | B1* | 10/2013 | Wong | G06Q 10/06 705/7.26 |
| 8,615,399 | B2* | 12/2013 | Birimisa | G06Q 10/06375 705/1.1 |
| 8,620,707 | B1* | 12/2013 | Belyi | G06Q 10/087 705/28 |

(Continued)

FOREIGN PATENT DOCUMENTS

CN 102142120 8/2011

*Primary Examiner* — Leland Marcus
(74) *Attorney, Agent, or Firm* — Curtis, Mallet-Prevost, Colt & Mosle LLP

(57) ABSTRACT

A computer based system and method for inventory management, cost savings delivery and decision making is disclosed. A global data warehouse contains a cost savings delivery mechanism CSD-M that is configured to receive information from a business intelligence module to create cost savings documentation that identifies and quantifies cost savings that are realized by use of an inventory management system and potential cost saving opportunities that may be realized by use of supply chain and operational cost savings programs.

30 Claims, 28 Drawing Sheets

(56) References Cited

U.S. PATENT DOCUMENTS

| | | |
|---|---|---|
| 8,732,039 B1 | 5/2014 | Chen |
| 9,053,452 B2* | 6/2015 | Bonomo ............. G06Q 10/087 |
| 2002/0116241 A1 | 8/2002 | Sandhu |
| 2004/0006700 A1 | 1/2004 | Freeman |
| 2004/0044438 A1 | 3/2004 | Lorraine |
| 2004/0083163 A1* | 4/2004 | Cooper ................ G06Q 30/02 |
| | | 705/38 |
| 2006/0026049 A1* | 2/2006 | Joseph ............... G06Q 10/0635 |
| | | 705/7.28 |
| 2006/0069629 A1 | 3/2006 | Schweutzer |
| 2006/0089888 A1 | 4/2006 | Roger |
| 2007/0220047 A1* | 9/2007 | Barletta ................ G06Q 10/06 |
| 2007/0250421 A1* | 10/2007 | Major ................... G06Q 10/06 |
| | | 705/35 |
| 2008/0082427 A1 | 4/2008 | Gandhi |
| 2008/0114630 A1* | 5/2008 | Chang .................. G06Q 10/00 |
| | | 705/7.22 |
| 2010/0174550 A1 | 7/2010 | Reverendo |
| 2011/0145030 A1 | 6/2011 | Allen |
| 2013/0080183 A1 | 3/2013 | Bond |
| 2013/0292465 A1* | 11/2013 | Bonomo ............. G06Q 10/087 |
| | | 235/375 |
| 2014/0257926 A1 | 9/2014 | Chen |
| 2016/0321609 A1* | 11/2016 | Dube ............... G06Q 10/08355 |

* cited by examiner

UPLOAD DATA

801

Labor Rates
---
Purchase Order Costs
---
Cost of Capital Figures
---
Procurement Card Percent of Savings
---
E-Procurement Improvement Percentages
---
Average Minutes Saved Per Web Transaction
---
Outside Sourcing Savings Per Event Figures
---
Purchase Order Reduction Percentage Figures
---
Vending Hours of Re-Stock Labor Figures
---
Outside Resources Provided Figures
---
Process Savings Figures
---
Competitor Pricing Figures
---
Energy Savings Figures
---
Water Savings Figures

ControlPoint Inventory Management Solutions

January, 2014 - December, 2014

Thank you for taking advantage of MSC's ControlPoint Inventory Management solutions, your total savings for this period are $28,090

| CONTROLPOINT INVENTORY MANAGEMENT SOLUTIONS | TOTAL SAVINGS |
|---|---|
| Industrial Vending<br>ControlPoint Inventory Management (IM) vending solutions are modular, configurable, flexible and offer a web-based dashboard view of your production inventory. This solution-set is built on the latest technology — touch-screen and cloud-computing, and powered by robust software that includes comprehensive reporting. | $25,133 |
| Customer Managed Inventory<br>ControlPoint CMI (Customer Managed Inventory) is an ordering tool which enables you to save time and money while effectively replenishing your inventory and stocking levels. Simply scan your barcoded products, connect your scanner to your PC, and automatically insert your order in a shopping cart on mscdirect.com for review, placement and order confirmation. | $1,890 |
| Vendor Managed Inventory<br>ControlPoint VMI (Vendor Managed Inventory) helps you manage your inventory and reduce the time you spend on the purchasing process. From purchasing to payables and everything in between. Leverage MSC's expertise in effectively managing inventory to provide you with a solution that yields more accurate inventory levels and reduces overhead cost by only having product on hand when you need it. | $1,067 |
| MSC ControlPoint Inventory Management Solutions saved ASC COMPANY a total of $28,090     *YOUR TOTAL SAVINGS* | $28,090 |

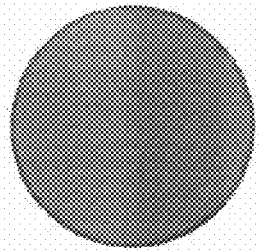

Fig. 13

Procurement Savings

January, 2014 - December, 2014

Thank you for taking advantage of MSC's Procurement Savings solutions, your total savings for this period are $2,087

| PROCUREMENT SAVINGS | TOTAL SAVINGS |
|---|---|
| mscdirect.com<br>User friendly and easy-to-navigate, our website, mscdirect.com, gives full access to every product we have available, and provides the convenience of managing your entire account online. Offering numerous time and cost-saving tools, our website can help your company create an efficient and productive procurement environment. | $1,929 |
| eProcurement<br>MSC partners with many of the largest eProcurement providers, including SAP, Ariba, Perfect Commerce, Oracle, and more. Additionally, we also support EDI (810, 850, 855, 856 and 997 documents) and XML (cXML, xcbG, Exam standards) transmissions. Interfacing your eProcurement system with MSC provides a great way to create a more efficient work flow and generate even greater cost savings. | $0 |
| Procurement Card<br>MSC Industrial Supply has teamed up with MasterCard, Visa and American Express to streamline your purchasing, accounts payable and general ledger posting processes. We provide Level I, II and III line item detail reporting for transactions. | $11 |
| Sourced Item<br>Reduce Sourcing Time -- A great deal of time may be currently spent sourcing indirect items and materials, which translates to high cost per Purchase Order generated. The time being spent per Purchase Order can be reduced, and this can be achieved in part through automation, through supplier reduction, through standardization, and through compliance. | $147 |
| MSC Procurement Savings saved ABC COMPANY a total of $2,087    YOUR TOTAL SAVINGS | $2,087 |

■ mscdirect.com   ■ eProcurement
■ Procurement Card   ■ Sourced Item

Fig. 14

Process Improvements

January, 2014 - December, 2014

Thank you for taking advantage of MSC's Process Improvements solutions, your total savings for this period are $23,750

| PROCESS IMPROVEMENTS | TOTAL SAVINGS |
|---|---|
| Product Process Application Savings A part(s) and/or component(s) substituted which offers a longer life, reduced consumption or both than an existing part, resulting in less cost. | $2750 |
| Green Water/Energy Savings Item(s) substituted: either a new part or modification of an existing part with energy or water saving results. This includes modifications to the process, product or service which qualifies a location for an energy/utility rebate whenever possible. | $7800 |
| Metal Working Process Application & Efficiency/Tooling Savings MSC introduces a Metalworking product or process resulting in cost avoidance or productivity improvements. Examples could be tool life improvement or cycle time reductions related to production. MSC submits a proposal to the appropriate personnel or his/her designate for approval, outlining project parameters and cost implications. | $13,200 |
| MSC Process Improvements saved ABC COMPANY a total of $23,750     YOUR TOTAL SAVINGS | $23,750 |

Fig. 16

Training and Consultative Services

January, 2014 - December, 2014

Thank you for taking advantage of MSC's Training and Consultative Services Savings solutions, your total savings for this period are $2,175

| TRAINING AND CONSULTATIVE SERVICES | TOTAL SAVINGS |
|---|---|
| Product Training<br>Product related training that is provided at no charge. | $150 |
| Web eProcurement<br>mscdirect.com related training that is provided at no charge. | $0 |
| Safety<br>Safety related training that is provided at no charge. | $0 |
| Business Needs Analysis<br>Business Needs Analysis that is provided at no charge. | $0 |
| Metalworking Tech Team<br>Metalworking Technical Application assistance that is provided at no charge. | $2025 |
| On-Site Team<br>ControlPoint Inventory Management Implementation Time (hours/days) to survey storeroom (i.e., taking inventory, assisting in arranging inventory, qualifying condition of inventory, etc.) that is provided at no charge. | $0 |
| On-Site Inside Sales Associate<br>MSC dedicated Outside Sales Associates assigned that will have direct responsibility for sales and technical support requirements at each location that is provided at no charge. | $0 |
| MSC Training and Consultative Services saved ABC COMPANY a total of $2175     YOUR TOTAL SAVINGS | $2175 |

Fig. 17

Opportunity Savings

January, 2014 - December, 2014

Did you know that MSC has a variety of cost-saving offerings that can help our customers create an efficient and productive work environment, while saving your company time and money.

| OPPORTUNITY SAVINGS | TOTAL SAVINGS |
|---|---|
| Alternative Item Product Replacement Did you know that MSC has an extensive product offering with functionally equivalent alternative products that can save on MW and MRO Purchases? Over the reporting period of January, 2014 to December, 2014 MSC made 0 lower cost items available for purchase that could have saved your company $0 | $0 |
| Average Order Size Did you know that increasing the average size of the orders that you place can help save your company on MW and MRO Purchases? Over the reporting period of January, 2014 to December, 2014 your Company's average order size was $1,204. Increasing your average order size by 25% to $1,505 could save up to $4,378. | $4,378 |
| Automated Procurement Solutions Did you know that MSC has Automated Procurement Solutions that can save your company on MW and MRO Purchases? With MSC CMI(Customer Managed Inventory) and VMI(Vendor Managed Inventory) solutions, you gain a clear view of what you have, take control of replenishing commonly used MRO and Metalworking items and cut procurement time and ordering costs. In addition, using our eProcurement solutions and mscdirect.com can help you cut costs and become more productive by doing business electronically. Over the reporting period of January, 2014 to December, 2014 your Company placed 436 orders, 292 of which leveraged one of MSCs Automated Procurement Solutions. Increasing the use of these solutions could result in an additional savings. Ask your representative for more details.<br><br>Solution    Order Count<br>Vending    126<br>CMI    0<br>VMI    0<br>MSCDirect.com    166<br>ePro    0<br>Manual Orders    144 | $583 |
| Common Item Did you know that if your company purchases the same item on a repetitive basis it could be an indication that your company would be a good candidate for one of MSCs Inventory Management Solutions. Our track record shows that your company could save time and money by streamlining your supply chain and reduce your operating costs with MSC's ControlPoint Inventory Management (IM) Solutions. Ask your representative for more details. |  |
| Green Water/Energy Savings Did you know that MSC offers thousands of items with environmentally preferable attributes? Using environmentally preferable products can help to lower energy cost, reduce water consumption etc... Over the reporting period of January, 2014 to December, 2014 your company purchased 1 SKU's with environmentally preferable products from MSC. Ask your representative for more details. |  |

| Title ▲ | Type |
|---|---|
| Cost Savings Audit Report | Crystal Reports |
| CS_01_FreightSavingsDetail.rpt | Crystal Reports |
| CS_02_FreightSavingsSummary.rpt | Crystal Reports |
| CS_03_Product Discount Detail Report.rpt | Crystal Reports |
| CS_04_Product Discount Summary Report.rpt | Crystal Reports |
| CS_05_LCP Conversion Savings Detail.rpt | Crystal Reports |
| CS_06_LCP Conversion Savings Summary.rpt | Crystal Reports |
| CS_07_LCP Non Conversion Savings Detail.rpt | Crystal Reports |
| CS_08_LCP Non Conversion Savings Summary.rpt | Crystal Reports |
| CS_11_WebSavingsDetail.rpt | Crystal Reports |
| CS_12_WebSavingsSummary.rpt | Crystal Reports |
| CS_13_VMISavingsDetail.rpt | Crystal Reports |
| CS_14_VMISavingsSummary.rpt | Crystal Reports |
| CS_15_VendingSavingsDetail.rpt | Crystal Reports |
| CS_16_VendingSavingsSummary.rpt | Crystal Reports |

| Documents | | | | |
|---|---|---|---|---|
| History – CS_12_WebSavingsSummary.rpt | | | | |
| View ▾ \| Organize ▾ \| Send ▾ \| More Actions ▾ | | | | |
| Instance Time ▾ | Title | | Status | Created By |
| Jul 10, 2014 1:05 PM | CS_12_WebSavingsSummary.rp | | Success | AmosI |
| Jul 9, 2014 3:58 PM | CS_12_WebSavingsSummary.rp | | Success | softyd |
| Jun 11, 2014 10:51 AM | CS_12_WebSavingsSummary.rp | | Success | doughere |
| Jun 10, 2014 4:20 PM | CS_12_WebSavingsSummary.rp | | Success | softyd |
| Jun 9, 2014 1:51 PM | CS_12_WebSavingsSummary.rp | | Success | doughere |
| Jun 2, 2014 2:48 PM | CS_12_WebSavingsSummary.rp | | Success | softyd |
| May 28, 2014 5:25 PM | CS_12_WebSavingsSummary.rp | | Success | doughere |

Fig. 27

SYSTEM AND METHOD FOR INVENTORY MANAGEMENT, COST SAVINGS DELIVERY AND DECISION MAKING

BACKGROUND OF THE INVENTION

1. Field of the Invention

This invention relates generally to inventory management systems, and more particularly to a computer based system and method for inventory management, cost savings delivery documentation and decision making.

2. Description of Related Art

In today's manufacturing environments, the complexity of supply chain management and overall business operations demands the use of computer based systems for many operational activities such as purchasing, inventory management, equipment operations and maintenance, and the like. As the complexity of supply chain and inventory management continues to increase, manufacturers are constantly looking for and evaluating inventory management and procurement tools to streamline and simplify their supply chain. The near universal reach of the internet has made e-commerce possible, and with the explosive growth of e-commerce the ability to procure materials and manage inventory by way of the internet is commonplace. This ability will continue to grow and develop as new products are developed and as technology advances and changes to meet the evolving needs of modern day business operations.

While there are software and database products available to perform many functions such as inventory management and procurement, there are little to no available products to help identify cost saving opportunities and report on realized and potential cost savings. Enhanced visibility of a manufacturer's supply chain and the transformation of the volumes of data generated by daily operations into meaningful and useful information that allows management to take actions to reduce cost and complexity of their operations is something that is very much lacking in today's world of inventory management and procurement. Unseen and unplanned costs that every manufacturing floor faces, such as excess inventory, lost productivity and expediting costs are often times not visible to management. Studies indicate that there is an estimated $145 billion of maintenance, repair and operations (MRO) inventory sitting hidden inside companies all over the U.S. Nearly 70% of that inventory will never be used.

Studies have shown that suppliers have not effectively delivered documented cost savings to their customer base. For example, a study by the Industrial Supply Association has shown that 74% of companies of various sizes have indicated that a distributor could earn a larger portion of their business if they provided "documented cost savings". Further surveys indicate that with customers of various sizes, 80% of those customers desired cost savings documentation, with 60% not satisfied with current documented cost savings and only 5% very satisfied with the documented cost savings provided by their suppliers. The reasons these customers gave for being unsatisfied were that suppliers were not providing documented cost savings at all, there was inconsistent delivery of cost savings, and when they did get cost savings information there was not enough detail.

What is needed is a system and method to help identify hidden costs with actionable information provided to help reduce those costs. What is also needed is a system and method to ensure that cost reduction actions are working as planned. What is also needed is a system and method for identifying potential new cost saving opportunities. What is further needed is a system and method for identifying areas for cost saving improvements. What is also needed is a detailed but easily understandable cost savings document that can be readily produced on demand.

The present invention provides such cost savings delivery and information using various inventory management systems and methods as further described herein. Various embodiments of the present invention will further become evident to one skilled in the art after a review of this specification, claims, and the attached drawings.

BRIEF SUMMARY OF THE INVENTION

In accordance with the present invention, there is provided a system for quantifying cost savings comprising a computer having a processor, memory, and access to computer readable media; a computer program stored on computer readable media having a business intelligence module; upload data stored on computer readable media for uploading customer specific data elements onto a global data warehouse; a harvester computer program stored on computer readable media for collecting, aggregating and validating the upload data received through a network; the global data warehouse computing system configured to receive information from the business intelligence module and to create cost savings documentation that identifies and quantifies cost savings that are realized by use of an inventory management system and potential cost saving opportunities that may be realized by use of supply chain and operational cost savings programs.

The foregoing paragraph has been provided by way of introduction, and is not intended to limit the scope of this invention as defined by this specification, claims, and the attached drawings.

BRIEF DESCRIPTION OF THE DRAWINGS

The invention will be described by reference to the following drawings, in which like numerals refer to like elements, and in which:

FIG. 8 is a data diagram of upload data for the Global Data Warehouse;

FIG. 12 depicts an example of a cost savings detail report;

FIG. 13 depicts a screenshot of total savings through inventory management;

FIG. 14 depicts a screenshot of procurement savings;

FIG. 16 depicts a screenshot of savings with process improvements;

FIG. 17 depicts a screenshot of savings with training and consultative services;

Figure 19:
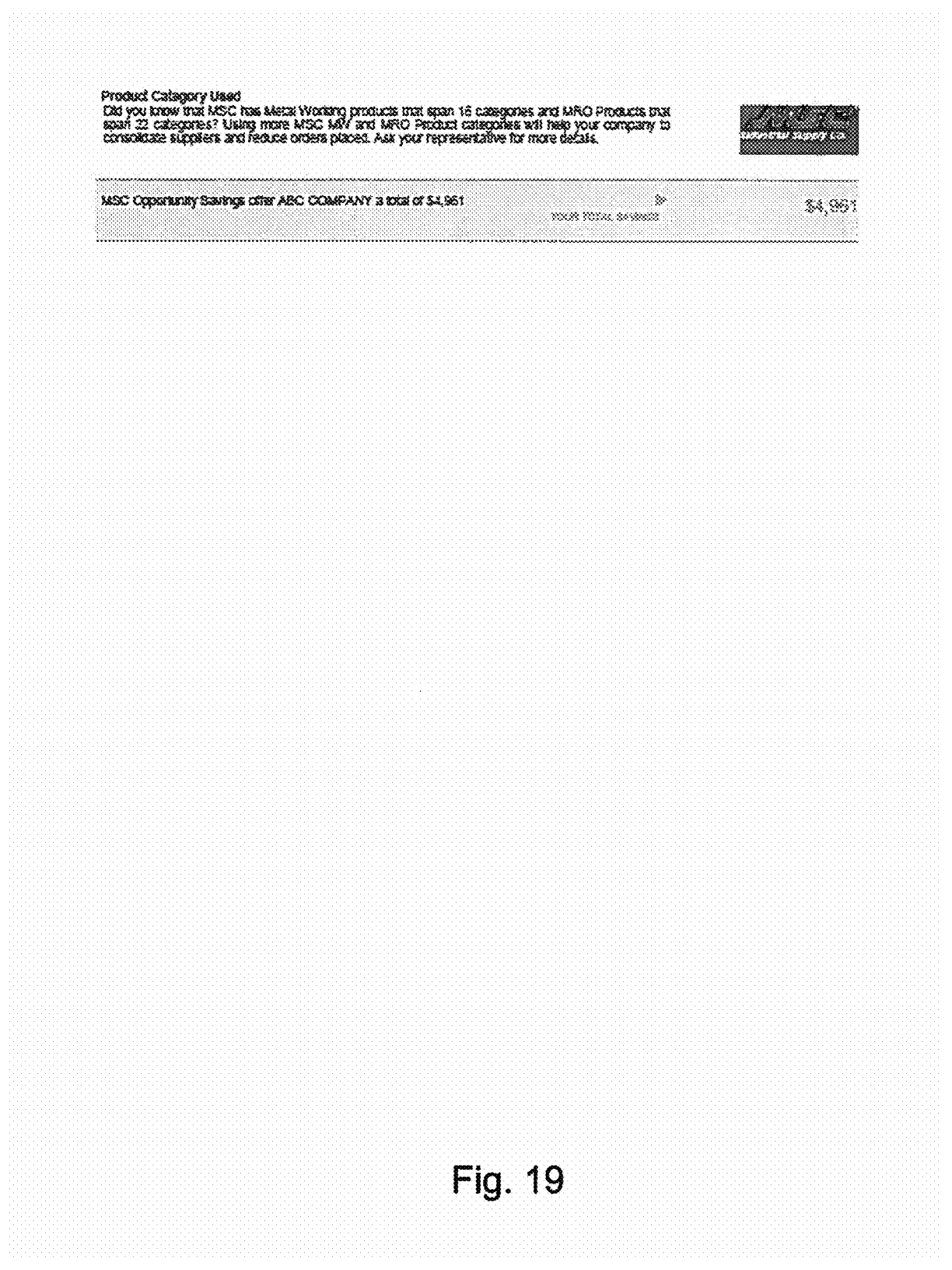

FIGS. 18 and 19 depict opportunity savings;

Figure 21:
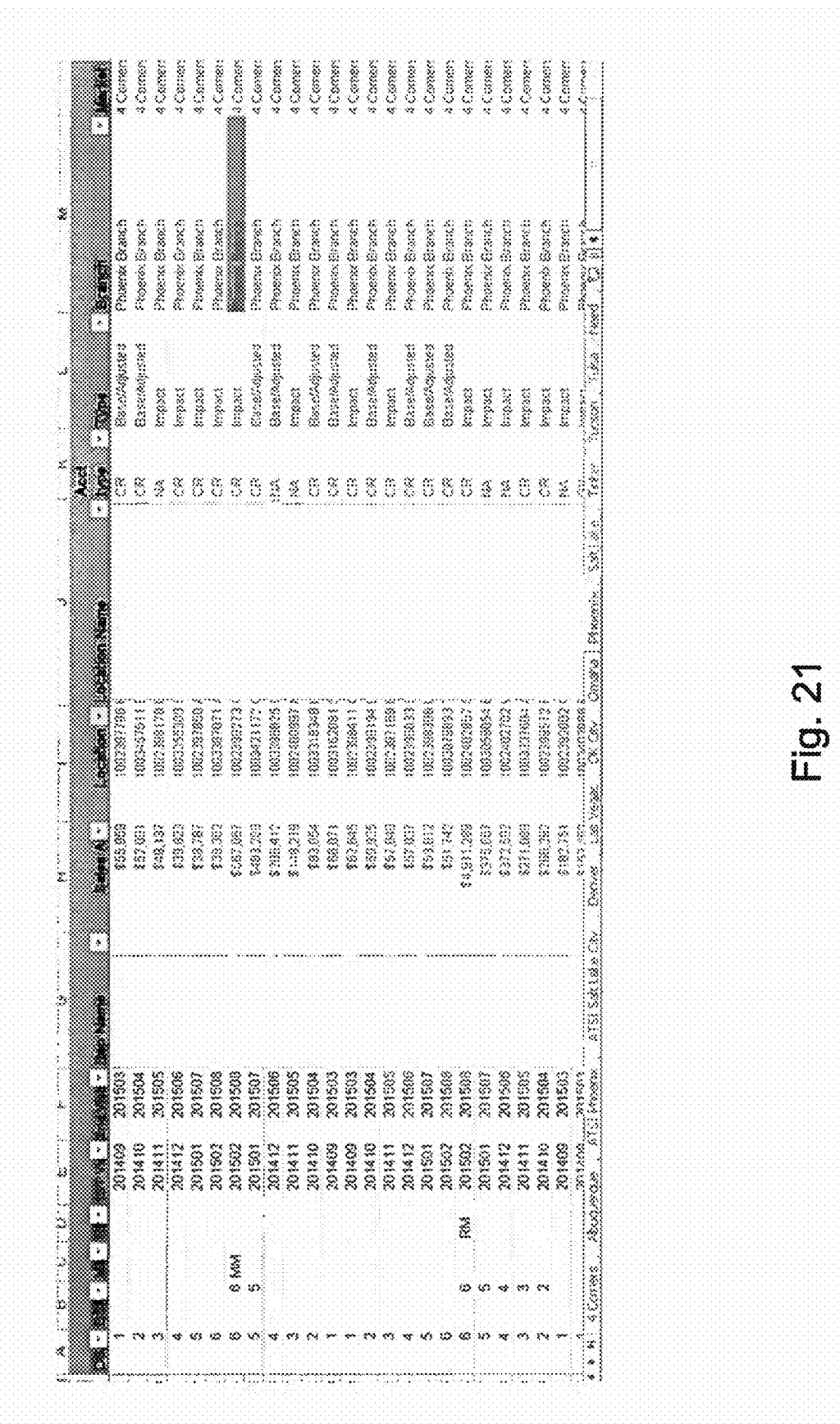

FIG. 21 depicts a screenshot of the CSD scheduler Branch/BSM view;

Figure 22:
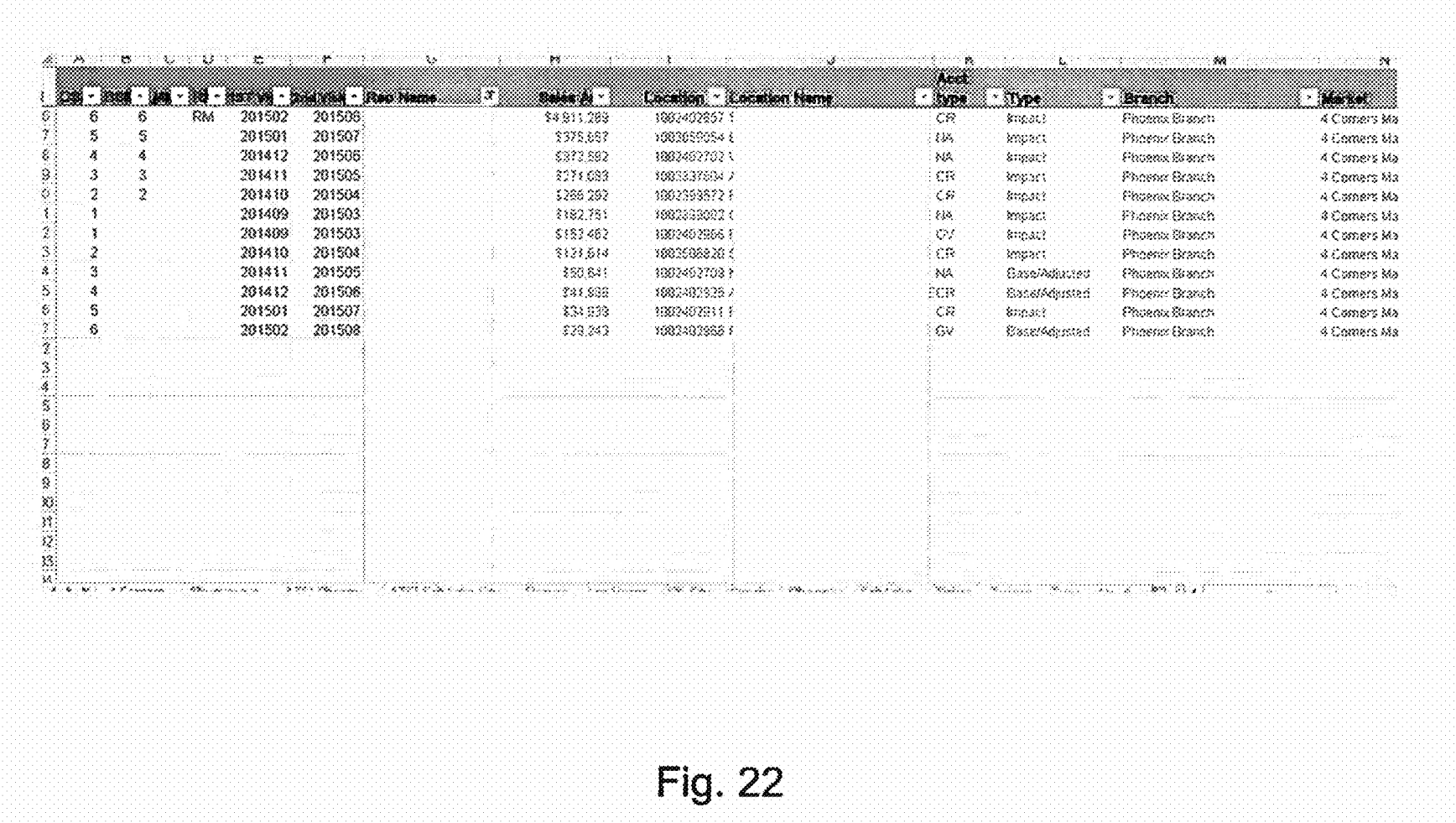

FIG. 22 depicts a screenshot of the CSD scheduler Rep View;

Figure 23:
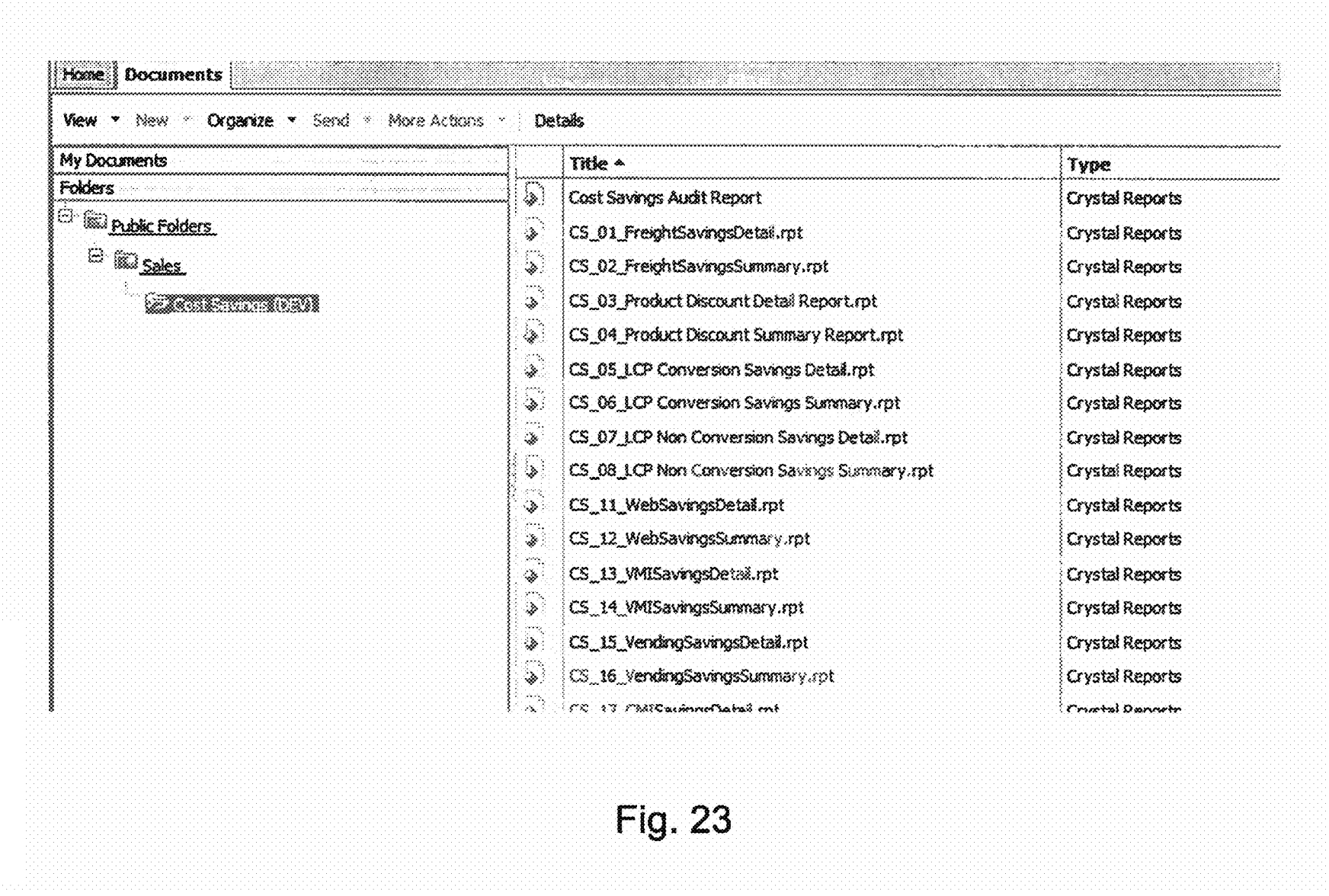

FIG. 23 depicts a screenshot of the request process for CSDR;

FIG. 24 depicts a further screenshot of the CSDR request process;

Figure 26:
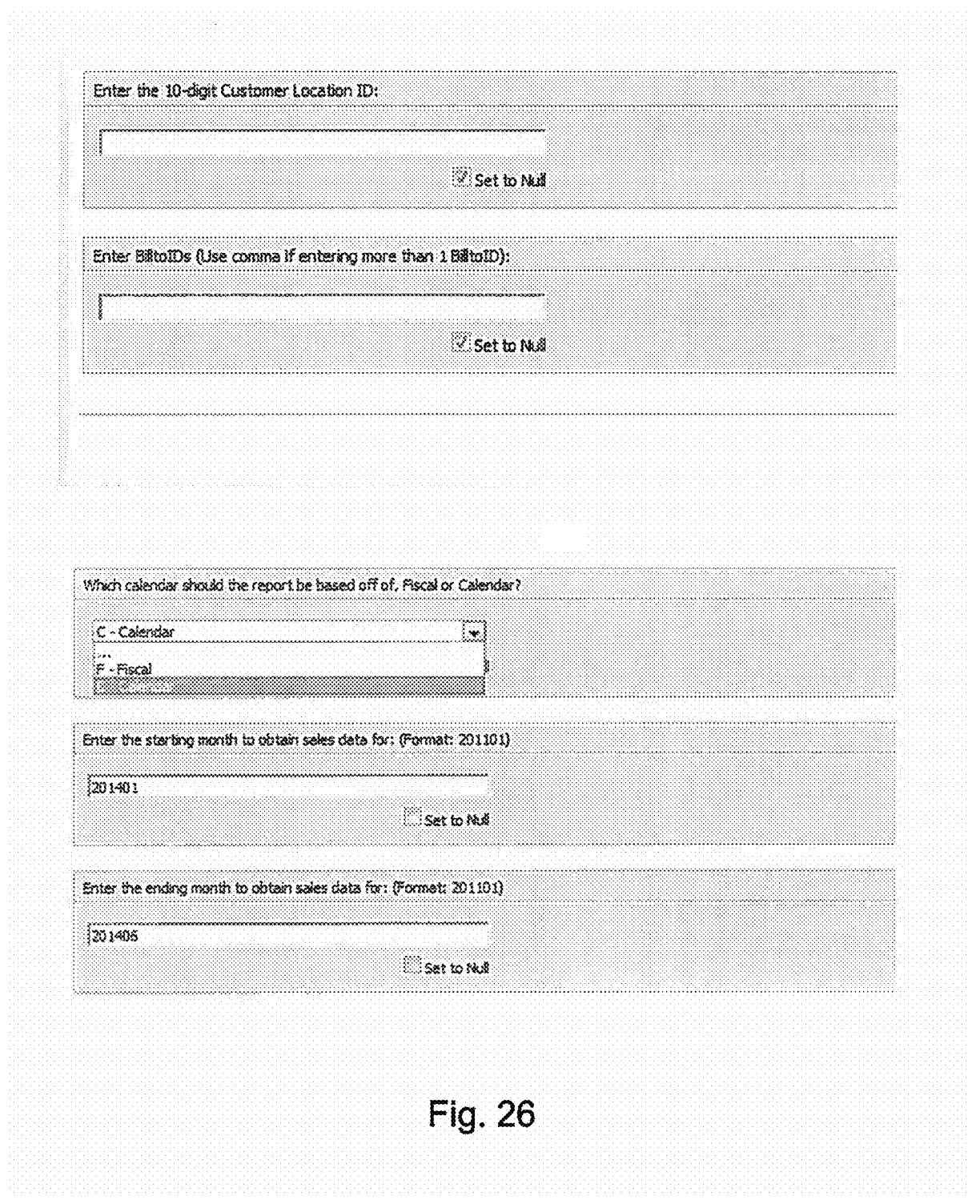

FIG. 26 depicts further screenshots of the CSDR request process for national and government accounts;

FIG. 27 depicts a screenshot of the retrieval process and distribution for CSDR.

Figure 1:
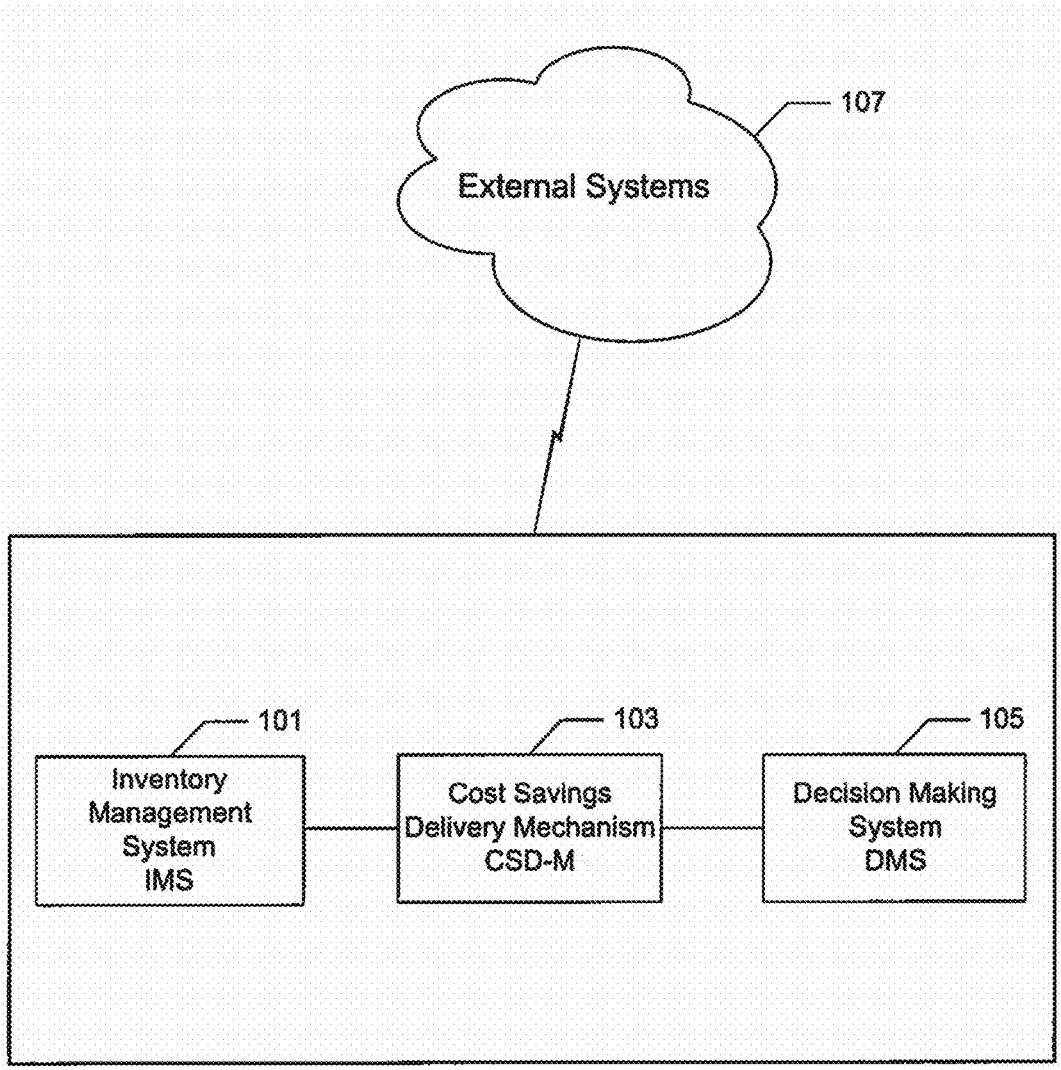
FIG. 1 is a block diagram depicting the system of the present invention.

The present invention will be described in connection with a preferred embodiment; however, it will be understood that there is no intent to limit the invention to the embodiment described. On the contrary, the intent is to cover all alternatives, modifications, and equivalents as may be included within the spirit and scope of the invention as defined by this specification, claims, and the attached drawings.

DESCRIPTION OF THE PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

For a general understanding of the present invention, reference is made to the drawings. In the drawings, like reference numerals have been used throughout to designate identical elements.

An architectural overview of the present invention is first presented. The complexity of the cost saving calculations described herein and the integration of the various cost saving categories into outputs useful for operational, business and management decision making specifically require a computer or, preferably, a network of computers in order to retrieve, process and create cost savings documentation that has heretofore not been possible.

Thus, a computer based system and method for managing inventory is described where cost savings documentation (CSD) is provided by way of a cost savings delivery mechanism (CSD-M). Decision making that has heretofore not been possible is achieved using the cost savings documentation (CSD) produced. A plurality of inputs are received by a Global Data Warehouse cost savings delivery mechanism (CSD-M) and calculations are performed on a computer (or computers) that output cost savings that have been realized or have the potential to be realized through the use of an inventory management system of the present invention. The inventory management system and method may, for example, be in the form of vending solutions, customer managed inventory or vendor managed inventory. Such an inventory management system may include a system and method for ordering supplies, and example of which is provided in U.S. Pat. No. 9,053,452 B2 and entitled Supply Ordering System And Method to Charles Bonomo et al., the entire disclosure of which is incorporated herein by reference in its entirety. The resulting cost savings documentation (CSD) produced by the cost savings delivery mechanism (CSD-M) of the present invention is therefore applicable to the various embodiments of the inventory management system and method as described and envisioned herein.

In some embodiments of the present invention, mobile devices will be used to access, update, modify, and otherwise use the cost savings delivery mechanism (CSD-M) described herein.

FIG. 1 depicts three components of the system of the present invention. An inventory management system (IMS) 101 can be seen. There are various inventory management systems, examples of which will be further described herein. The Cost Savings Delivery Mechanism (CSD-M) System 103 can also be seen where outputs from the Inventory Management System (IMS) feed CSD-M. Outputs from CSD-M in turn drive the Decision Making System (DMS) 105 which uses information from CSD-M to identify decisions that can be made from the potential cost savings, realized cost savings, and the like provided by CSD-M. External systems 107 may also provide or receive information from CSD-M 103, or also from the IMS 101 or the DMS 105.

Figure 2:
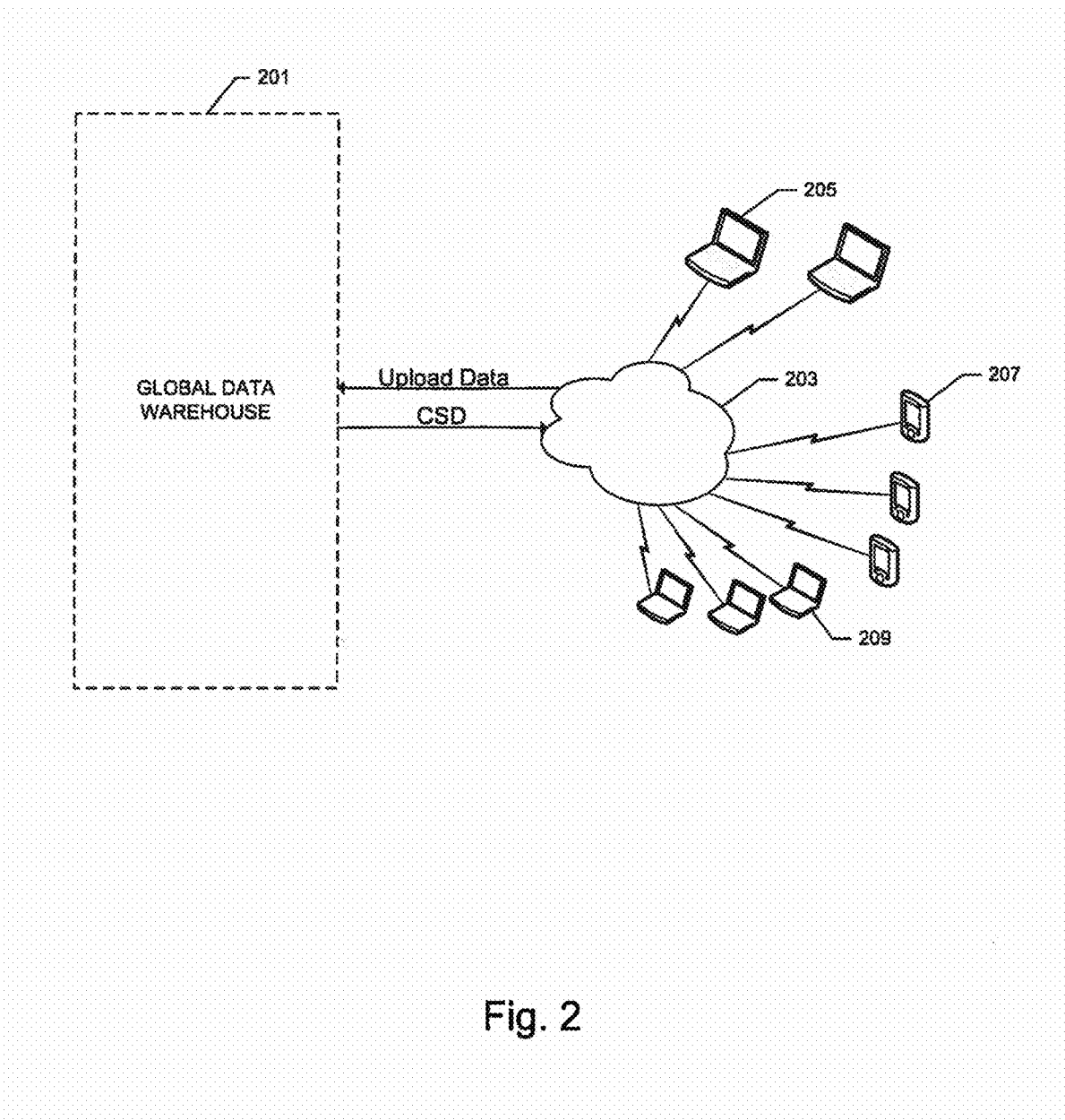
FIG. 2 is a network diagram depicting interaction with the Global Data Warehouse.

FIG. 2 is a network diagram depicting interaction with the Global Data Warehouse where various devices such as laptops 209 and other computers 205, as well as handheld devices 207 interact with the Global Data Warehouse 201 through a network 203 such as the internet, the wireless network, or the like. Upload data is transferred to the Global Data Warehouse 201 and may include inventory status information, inventory change information, purchasing and cost information, and the like. CSD information is then transferred from the Global Data Warehouse 201 to one of the various devices depicted after such transfer has been requested on a device.

Figure 3:
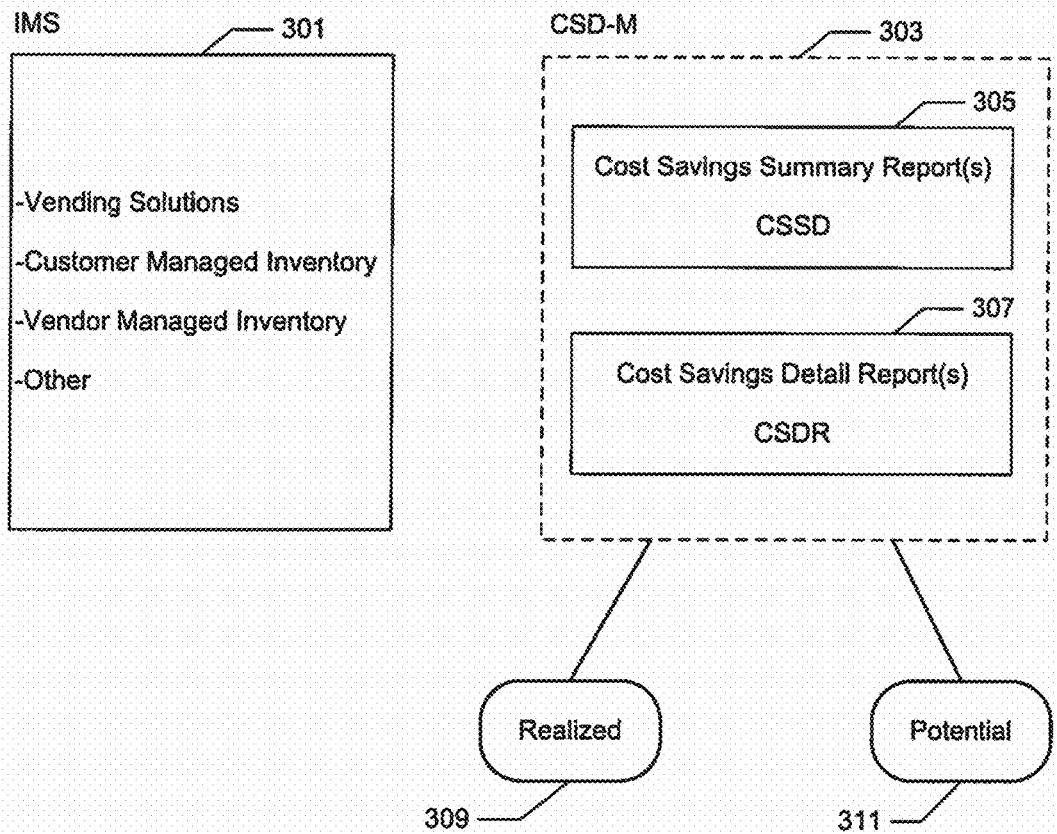
FIG. 3 is a block diagram of the IMS and CSD components of the present invention.

FIG. 3 is a block diagram of the IMS and CSD-M components of the present invention, each of which will be defined in further detail herein. Various inventory management systems (IMS) 301 can be utilized, including customer managed inventory and vendor managed inventory as well as vending solutions or other such systems. Examples of various inventory management systems (IMS) are provided herein. The Cost Savings Documentation product which is produced by the cost savings delivery mechanism (CSD-M) 303 includes Cost Savings Summary Report(s) CSSR 305 and Cost Savings Detail Report(s) CSDR 307. Each of these reports will be later described herein and examples of each provided. The reports provide both realized savings 309 as well as potential savings 311.

The cost savings delivery mechanism (CSD-M) system provides a cost savings summary report that describes both the cost savings that have been realized by using the inventory management system and method as well as savings opportunities (potential cost savings). Further, cost savings detail reports can be created on demand that contain further details of the cost savings stated in the summary report. The cost savings information can also be uploaded to other downstream or upstream systems for further utility.

There are various cost saving categories that are provided in CSD-M and the resulting cost savings documentation. These categories include:

1. Labor savings element that results from using the inventory management system.
2. Purchase Order cost reductions that result from using the inventory management system.
3. Inventory reductions and associated cost savings that result from using the inventory management system.
4. Stock out reductions (no out of stock or emergency replenishment situations) due to use of the inventory management system that in turn result in lower cost.
5. Put away cost reductions (cost to restock inventory) that result from using the inventory management system.

The System and Method for Inventory Management, Cost Savings Delivery (CSD) and Decision Making is applicable to many aspects of inventory management, including, for example, industrial supplies, manufacturing components, maintenance and repair supplies, janitorial supplies, safety supplies, and the like.

Vendor Managed Inventory (VMI) is a system to manage an operation's inventory that results in cost savings to the operation. An on-line ordering system, for example, along with the establishment of minimum and maximum inventory levels, reorder and replenishment levels, and the like, are some examples of the VMI system that result in cost savings. An approval process is also part of the VMI system. Calculations using the key elements of the VMI system result in cost saving metrics as part of Cost Savings Documentation (CSD). Key elements of VMI that result in cost savings documentation include:

Time Studies of Manual Inventory Management vs. VMI that can be adjusted globally.

Number of SKU's in a specified computer system that is managed by VMI

Figure 6:
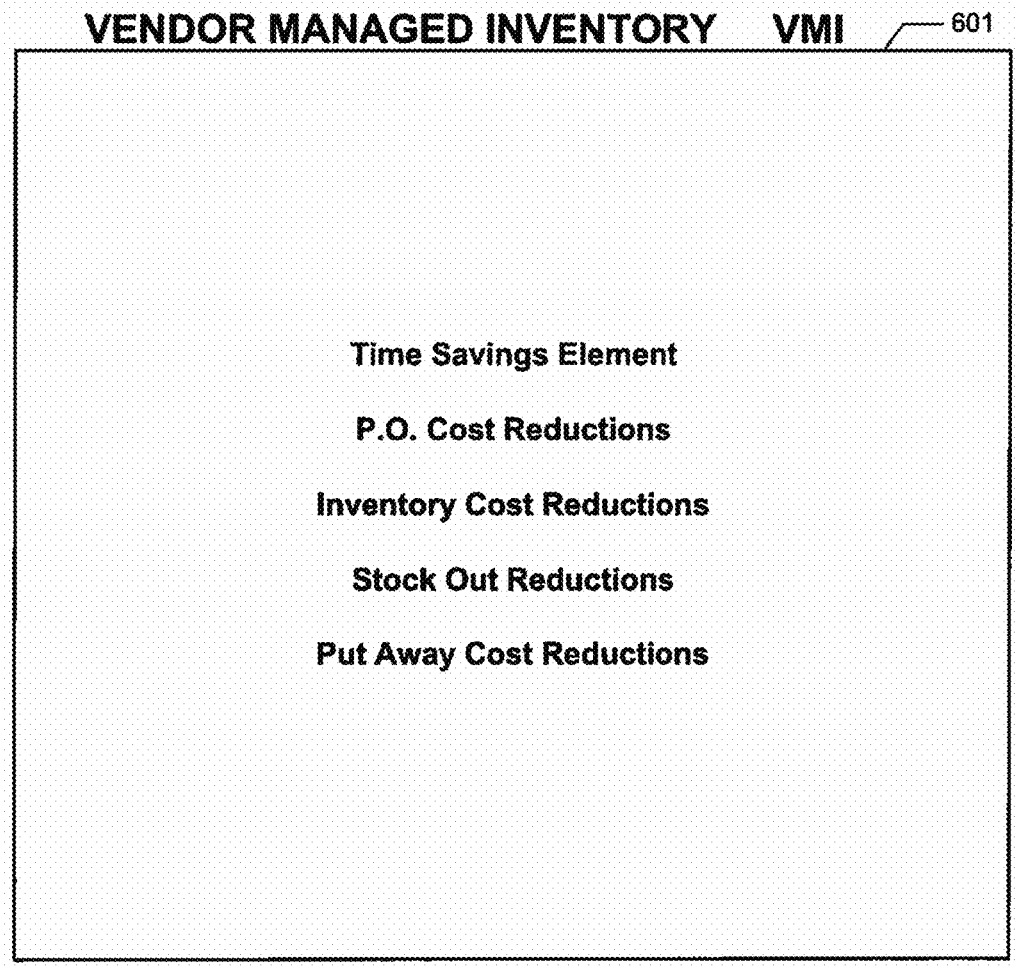
FIG. 6 is a diagram depicting the cost saving components of a vendor managed inventory IMS.

Hourly Rate that is customizable by customer or uses Global Defaults that can be adjusted as the customer landscape changes Number of Actual Customer VMI Purchase Orders placed with VMI provider Purchase Order Reduction. Inventory Reductions or Stock Out Reductions that can leverage customer specific information or globally obtained data As seen in FIG. 6, the variables that go into cost savings calculations for Vendor Managed Inventory VMI 601 include: Purchase Order cost reductions, inventory cost reductions, stock out reductions, time savings and put-a-way cost reductions. A summation of these cost savings calculations yields total cost savings over a given or specified period, the output of which is provided as a report or the like.

Figure 5:
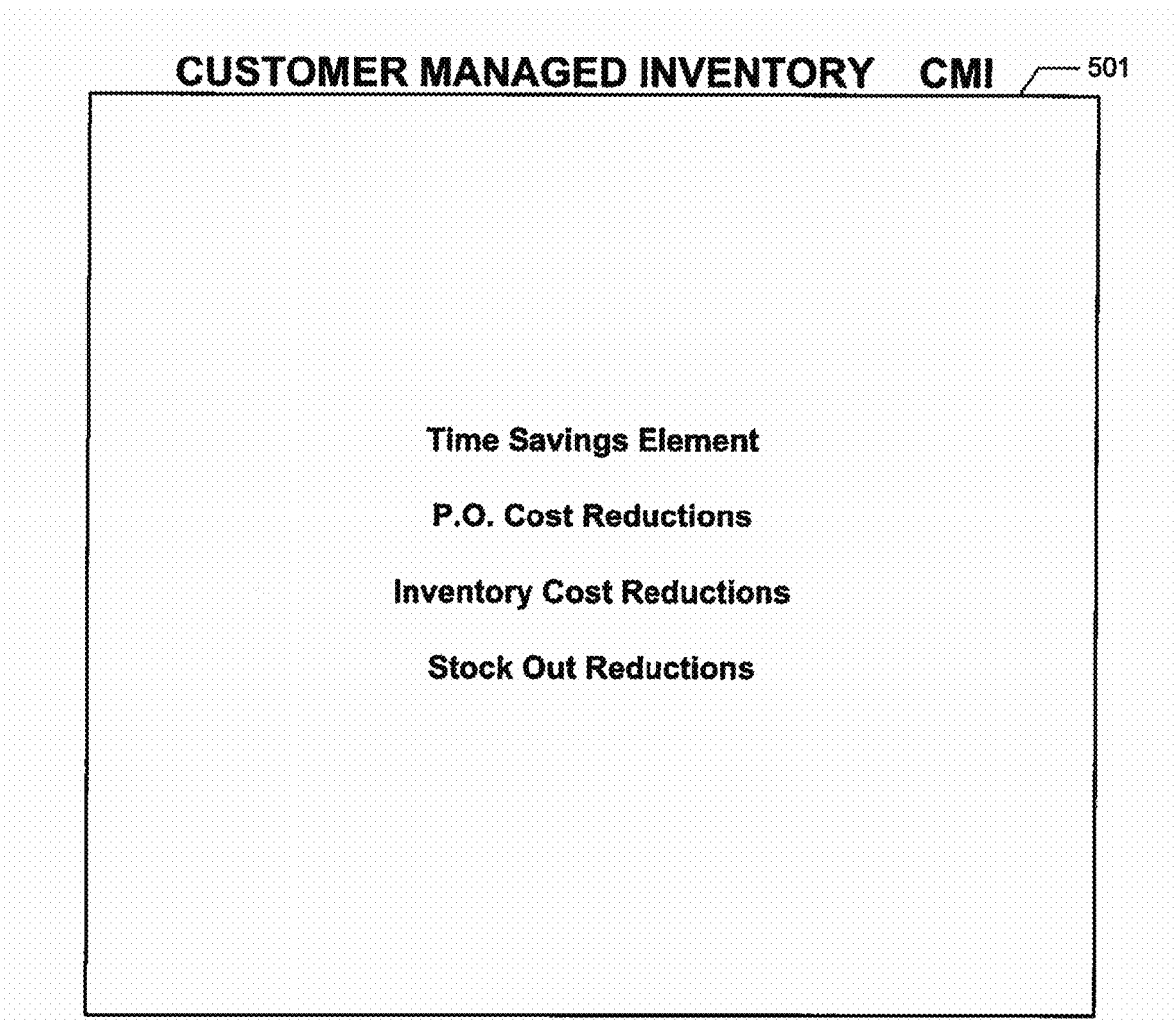
FIG. 5 is a diagram depicting the cost saving components of a customer managed inventory IMS.

For Customer Managed Inventory (CMI), the variables that go into cost savings calculations include Purchase Order cost reductions, inventory cost reductions, stock out reductions, and time savings. These variables are depicted in FIG. 5 for Customer Managed Inventory (CMI) 501.

Calculations and related methods performed by the system of the present invention that result in Cost Savings Documentation for VMI are provided as follows:

| | | | | VMI Time Savings | | | | | |
|---|---|---|---|---|---|---|---|---|---|
| | | | Manual Process Time Total (hrs.) | | | | VMI Time Total (hrs.) | | |
| Category | SKU's Count | Calculation | Time Value (sec) | Calculation | Convert from Seconds to Hours | Value (hr.) | Time Value (sec) | Calculation | Convert from Seconds to Hours | Value (hr.) |
| Visually scan items | 14000 | Count of records in VXRF for customer | 5 | # SKUs × Manual Process Time | | 19.4 | 0 | # SKUs × Manual Process Time | | 0.00 |
| Write down items | 2800 | 20% × # of SKU's Visually scan items | 5 | # SKUs × Manual Process Time | | 3.9 | 0 | # SKUs × Manual Process Time | | 0.00 |
| Find part number | 2800 | =# of SKU's Write down items | 5 | # SKUs × Manual Process Time | | 3.9 | 0 | # SKUs × Manual Process Time | | 0.00 |
| Create PO | 2800 | =# of Find Part Number | 5 | # SKUs × Manual Process Time | | 3.9 | 5 | # SKUs × Manual Process Time | | 3.89 |
| Order items | 2800 | =# of SKU's Create PO | 5 | # SKUs × Manual Process Time | | 3.9 | 5 | # SKUs × Manual Process Time | | 3.89 |
| Hourly Rate of | $25.00 | Info = Default or SOS | Total Time for Manual Process Hrly Rate × total time for manual process | | | 35.0 $875.00 | Total Time for VMI Hrly Rate × total time for VMI | | | 7.78 $194.44 |
| Total $ Saved in Time (per order) | | | | | | | | | | $680.56 |

| Category | Value | Calculation | Value | Calculation | Value | Calculation | Value | Calculation |
|---|---|---|---|---|---|---|---|---|
| PO Reduction | # of PO's 100 | Count of VMI PO's | Reduction % - 20% | Hardcode | PO Cost $100.00 | Default or SOS | Total $ Savings $2,000. | (# of PO's × Reduction %) × PO Cost |

| | | | | VMI Time Savings | | | |
|---|---|---|---|---|---|---|---|
| Inventory Reductions | Sales $1,000. | Sums of Sales by Order Source Code | Reduction % - 20% | Hardcode | Opportunity Cost of Capital 10.14% | Default or SOS | (Sales × Reduction %) × Opportunity Cost of Capital |
| Stock Out Reduction | # of PO's 100 | Count of VMI PO's | Reduction % - 20% | Hardcode | Labor Rate $64.00 | Default or SOS | (# of PO's × Reduction %) × Labor Rate |
| Put-A-Way | # of PO's 100 | Count of VMI PO's | | | Labor Rate $64.00 | Default or SOS | (# of PO's × Reduction %) × Labor Rate |

| Category | Value | Calculation |
|---|---|---|
| Total Savings for VMI | $10,380.84 | PO Reduction + Inventory Reductions + Stock Out Reduction + Time Savings + Put-A-Way |

There are several forms of procurement that can also provide cost savings documentation using the system and method of the present invention. These forms of procurement include website purchases, referred to by example and not limitation as MSCDirect.com, E-Procurement, and Procurement Card. The procurement savings calculations for each are further described below:

For website purchases, such as MSCDirect.com, the key elements used include Hourly Rate, reduction percentage and Purchase Order Cost that is customizable by, for example, by an account manager or Global Defaults may also be employed that can be adjusted as the customer landscape changes. The number of actual customer web Purchase Orders placed is also a key element of the cost savings calculations. Purchase Order cost reduction can leverage customer specific information or globally obtained data.

An example of the calculations performed by the system of the present invention that result in Cost Savings Documentation for website purchases is provided as follows:

| | | | | MSCDirect.com | | | | |
|---|---|---|---|---|---|---|---|---|
| Category | Value | Calculation | Value | Calculation | Value | Calculation | Value | Calculation |
| PO Reduction | # of PO's 1680 | Count of Web Orders | Reduction % 20% | Default or SOS | PO Cost $53.00 | Default or SOS | Total $ Savings $17,808.00 | (# of PO's × Reduction %) × PO Cost |
| Time Saved | # of PO's 1680 | Count of Web Orders | Reduction % 20% | Default or SOS | Labor Rate $28.00 | Default or SOS | Total $ Savings $17,808.00 | (PO × (avg Min Saved per Order/60) × Labor Rate |

| Category | Value | Calculation |
|---|---|---|
| Total Savings for MSCDirect.com | $21,728.00 | PO Reduction + Time Saved |

For E-Procurement, the key elements used include Hourly Rate, reduction percentage and Purchase Order Cost that is customizable by, for example, an account manager. Global Defaults may also be employed that can be adjusted as the customer landscape changes.

The number of actual customer E-Procurement Purchase Orders placed is also a key element of the cost savings calculations performed by CSD-M. Purchase Order cost reduction can leverage customer specific information or globally obtained data.

An example of the calculations performed by the system of the present invention that result in Cost Savings Documentation for E-Procurement purchases is provided as follows:

| | | | | E-Pro | | | | |
|---|---|---|---|---|---|---|---|---|
| Category | Value | Calculation | Value | Calculation | Value | Calculation | Value | Calculation |
| PO Reduction | # PO's 100 | Count of E-Pro Orders | Reduction % 20% | Default or SOS | PO Cost $100.00 | Default or SOS | Total $ Savings $2,000.00 | (# of PO's × Reduction %) × PO Cost |

-continued

| E-Pro | | | | | | | |
|---|---|---|---|---|---|---|---|
| Time Saved | # of PO's 100 | Count of E-Pro Orders | Avg Min Saved Per Order 5.00 | Default or SOS | Labor Rate $64.00 | Default or SOS | Total $ Savings $32,000.00 | (# of PO's × Avg Min Saved per Order) × Labor Rate |

| Category | Value | Calculation |
|---|---|---|
| Total Savings for VMI | $34,000.00 | PO Reduction + Time Saved |

For Procurement Card purchases, the key elements used include Hourly Rate, reduction percentage and Purchase Order Cost that is customizable by, for example, by an account manager or Global Defaults may also be employed that can be adjusted as the customer landscape changes.

The number of actual customer Procurement Card Purchase Orders placed is also a key element of the cost savings calculations. Purchase Order cost reduction can leverage customer specific information or globally obtained data.

An example of the calculations performed by the system of the present invention that result in Cost Savings Documentation for Procurement Card purchases is provided as follows:

| P-Card | | | | | | | | |
|---|---|---|---|---|---|---|---|---|
| Category | Value | Calculation | Value | Calculation | Value | Calculation | Value | Calculation |
| PO Reduction | # of PO's 100 | Count of P-Card Orders | Reduction % 20% | Default or SOS | PO Cost $100.00 | Default or SOS | Total $ Savings $2,000.00 | (# of PO's × Reduction %) × PO Cost |
| Time Saved | # of PO's 100 | Count of P-Card Orders | Avg Min Saved per Order 5.00 | Default or SOS | Labor Rate $64.00 | Default or SOS | Total $ Savings $32,000.00 | (# of PO's × Avg Min Saved per Order) × Labor Rate |

| Category | Value | Calculation |
|---|---|---|
| Total Savings for VMI | $34,000.00 | PO Reduction + Time Saved |

For Vending Solutions Cost Savings calculations, key elements include Time Studies performed by the provider of Manual compared to the provider Vending Program. These time studies can be adjusted Globally. The number of SKU's in the Global Data Warehouse managed on the Vending Program are also part of the cost saving calculations. An Hourly Rate which is customizable by customer or uses global defaults that can be adjusted as the customer landscape changes. The number of Actual Customer Vending Purchase Orders placed with MSC. Purchase Order Reduction. Inventory Reductions or Stock Out Reductions can leverage customer specific information or Globally obtained data.

Figure 4:
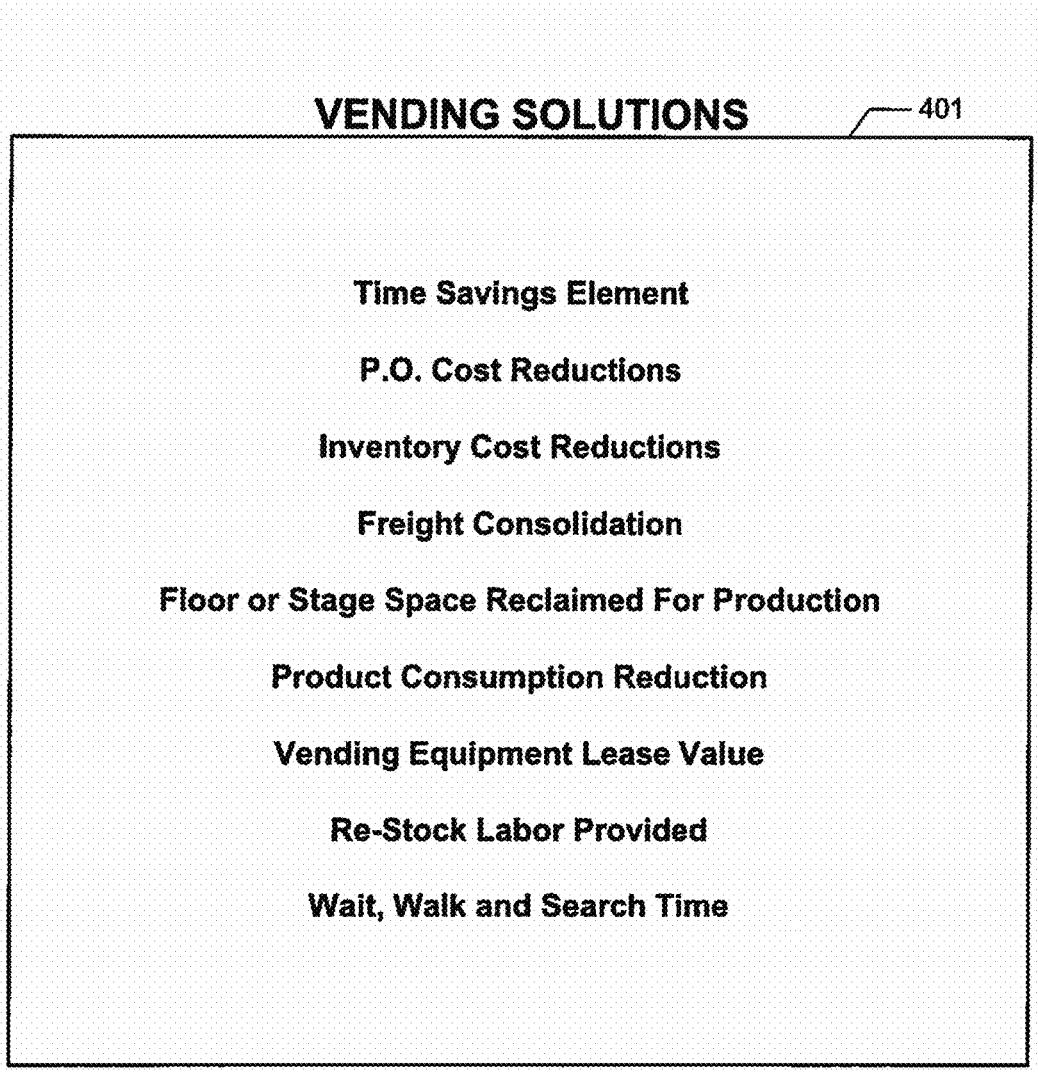
FIG. 4 is a diagram depicting the cost saving components of a vending solutions IMS.

FIG. 4 depicts the key components that are summed together to yield total cost savings for Vending Solutions 401.

An example of the calculations performed by the system of the present invention that result in Cost Savings Documentation for Vending Cost Savings is provided as follows:

| MSC Vending | | |
|---|---|---|
| CSD Element | Value | Source of Value |
| How many Vending machines are installed at the customer? | x | SPS |
| How much time (hours) do you spend on the procurement process each month? | x | Customer |
| Actual number vending Transactions (trips) per reporting period | x | SPS |
| Count of vending PO's | sps | |

| Category | Value | Calculation | Value | Calculation | Value | Calculation | Value | Calculation |
|---|---|---|---|---|---|---|---|---|
| PO Reduction | # of PO's 100 | Count of Vending PO's | Reduction % - 20% | Default or SOS | PO Cost $53.00 | Default or SOS | Total $ Savings $1,060.00 | (# of PO's × Reduction %) × PO Cost |

| MSC Vending | | | | | | | | |
|---|---|---|---|---|---|---|---|---|
| Freight Consolidation | # of PO's 100 | Count of Vending PO's | Reduction % - 20% | Default or SOS | Freight Cost $10.98 | Default or SOS | Total $ Savings $219.60 | (# of PO's × Reduction %) × Freight Costs |
| Inventory Reductions | Pre-Vending Inventory Value $ | SOS | Post Vending Inventory Value $12,500. | SOS | Cost of Capital 10.14% | Default or SOS | Total $ Savings - $1,267.50 | (Sales × Reduction %) × Opportunity Cost of Capital |
| Floor or Stage Space reclaimed for Product Consumption Reduction | SqFt Saved 0 $ reduced from Vending Implementation - $0.00 | Default or SOS | SqFt$ $64.00 | Default or SOS | | | Total $ Savings - $0.00 Total $ Savings - $0.00 | SqFt Saved * SqFt$ Value on SOS |
| Vending Equipment Lease Value | Vending Equipment Lease Value 4580 | Default or SOS | Vending Software Value 0 | Default or SOS | Number of Vending Machines 12 | Default or SOS | Total $ Savings $56,160.00 | (Equipment Lease + Vending Software Cost) × Number of Vending Machines |
| Re-Stock Labor Provided | Hrs. of Re-Stock Labor 0 | Default or SOS | Labor Rate $54.00 | Default or SOS | | | Total $ Savings $0.00 | Hr of Re-stock labor × Labor Rate |
| Wait, Walk and Search Time | # of transactions per reporting period 5 | Typical walk, wait and search time per transaction (min) 5. Default or SOS. | | Based on report | Labor Rate $32.00 | Default or SOS | Total $ Savings $0.00 | |

Various aspects of the present invention and the embodiments described and envisioned herein also contain process savings calculations where the benefits of a change in process, such as replacing an existing product with a new product that requires less usage, less maintenance, repair or replacement, or additionally has a lower price, is calculated and reported on. For process savings calculations, key elements include information that is collected from, for example, a customer account manager. Information is then uploaded to the Global Data Warehouse for storage and future retrieval and use.

An example of the calculations and methods performed by the system of the present invention that result in Process Savings Documentation is provided as follows:

| Values | | | | Calculations | | |
|---|---|---|---|---|---|---|
| Price (New vs Old) | | Usage (New vs Old) | | New | Old | Old − New |
| New #1 | Old #1 | New #1 | Old #1 | New #1 Price * New #1 Useage | Old #1 Price * Old #1 Useage | Product of Old #1 Calculation − Product of New #1 Calculation |
| $10.00 | $5.00 | 10 | 50 | $100.00 | $250.00 | $150.00 |

Various aspects of the present invention and the embodiments described and envisioned herein also contain resource savings calculations where the benefits of a change in resource, such as various forms of training, business needs analysis, and the like, is calculated and reported on. For resource savings calculations, key elements include information that is collected from, for example, a customer account manager. Information is then uploaded to the Global Data Warehouse for storage and future retrieval and use.

An example of the calculations performed by the system of the present invention that result in Resource Savings Documentation is provided as follows:

| Category | Value Hrs. | Office Staff Labor Rate | Calculation | |
|---|---|---|---|---|
| Web/E-Procurement Training | 1 Upload Sheet | $64.00 | Web/E-Procurement Training * Office Staff Labor Rate | $64.00 |
| Specialized Product Training | 2 Upload Sheet | $64.00 | Specialized Product Training * Office Staff Labor Rate | $128.00 |
| Safety Training | 3 Upload Sheet | $64.00 | Safety Training * Office Staff Labor Rate | $192.00 |
| Business Needs Analysis | 4 Upload Sheet | $64.00 | Business Needs Analysis * Office Staff Labor Rate | $256.00 |
| Metal Working Tech Team | 5 Upload Sheet | $64.00 | Metal Working Tech Team * Office Staff Labor Rate | $320.00 |
| Implementation Team On-site | 6 Upload Sheet | $64.00 | Implementation Team On-site * Office Staff Labor Rate | $384.00 |
| On Site Inside Sales Associate - Hrs per week | 7 Upload Sheet | $64.00 | On Site Inside Sales Associate - Hrs per week * Office Staff Labor Rate | $448.00 |

Various aspects of the present invention and the embodiments described and envisioned herein also contain sourced item savings calculations where the benefits of sourcing an item is calculated and reported on. For sourced item savings calculations, the hourly rate and time is customizable by, for example, an account manager by way of the upload process described herein, or using global defaults that can be adjusted as the customer landscape changes. Included in the sourced item savings calculations is the number of actual items that, for example, an inside sales team sources for a customer and the resulting order that is placed.

An example of the calculations performed by the system of the present invention that result in Sourced Item Savings Documentation is provided as follows:

| Desription | Value | location |
|---|---|---|
| MSC Sourcing saves the customer how much time per event? (minutes) | 15 | (Default or Override) |
| Hourly Wage - Office Staff (Purchasing, Purchasing Mgr.) | $28.00 | (Default or Override) |
| # of sourced items | 200 | AS400 |
| Total Savings | $1,400.00 | |
| Calculation | | |
| MSC Sourcing saves the customer how much time per event? (minutes) × Hourly Wage - Office Staff (Purchasing, Purchasing Mgr.) × # of sourced Items | | |

Figure 7:
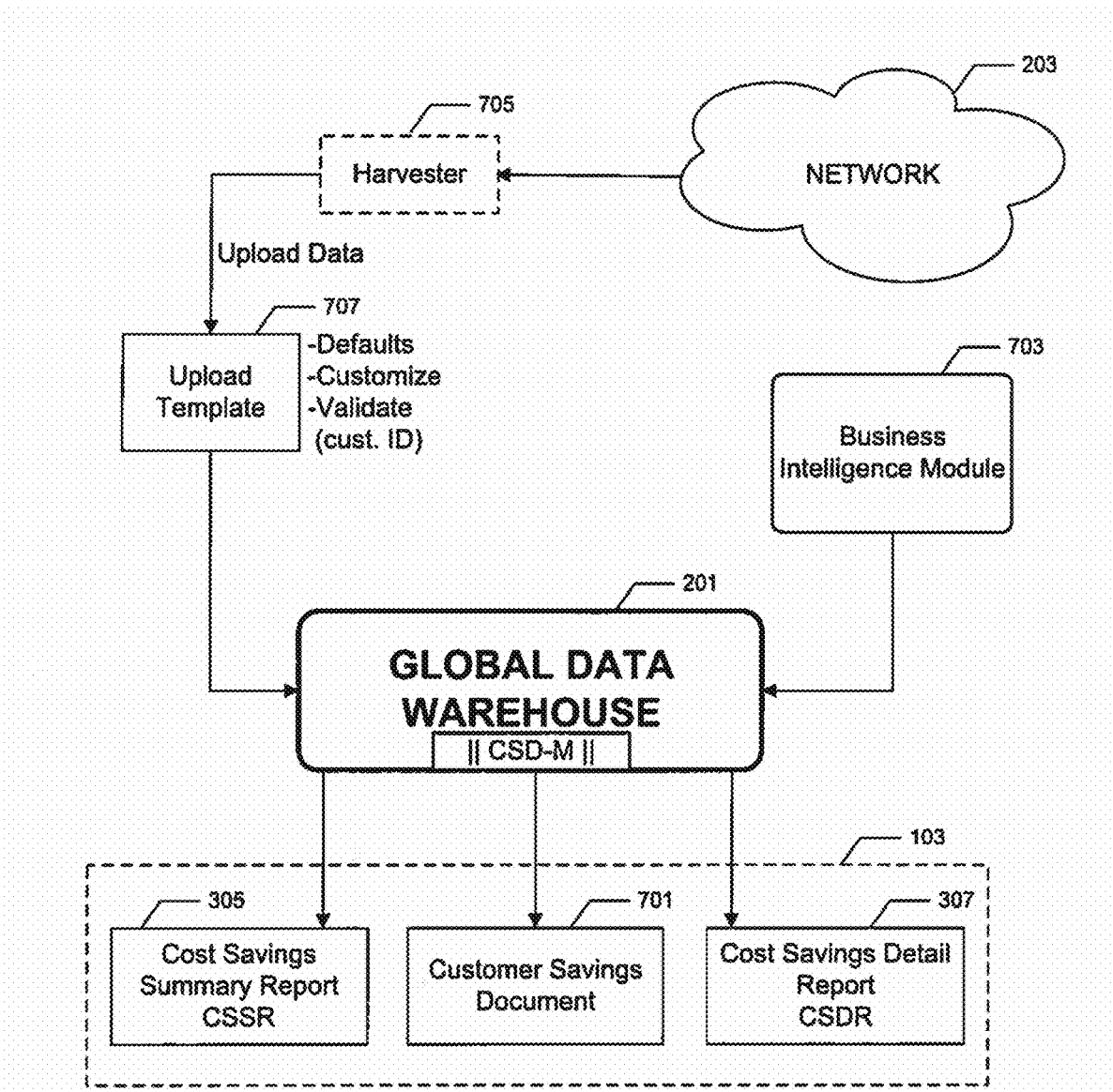
FIG. 7 is a data flow diagram of the present invention.

The calculations and variables used to produce the Cost Savings Summary Reports and the Cost Savings Detail Reports having been previously described, data flow through the various systems is described by way of FIG. 7. A Business Intelligence Module 703 provides customer specific information such as the inventory information previously described to a Global Data Warehouse 201 which may, in some embodiments of the present invention, contain the cost savings delivery mechanism CSD-M. The customer specific information in the Business Intelligence Module 703 may be modified, created, deleted, or otherwise edited to provide the necessary underlying information for the operations of CSD-M. Inventory and cost information is transferred through a network 203 into a Harvester 705 where the Harvester 705 receives an upload template such as that illustrated herein. A customer identifier (cust. ID) is used to validate the upload template against a customer profile or other customer specific information. The upload template can be customized or can use default values. The upload template may be prepared in the field and sent to the Harvester 705. In some embodiments of the present invention, the upload template is resident on a smart phone or other such mobile computing device and the harvester 705 comprises a data transfer mechanism from the smart phone or mobile computing device to the Global Data Warehouse 201.

Once the information contained in the upload template is transferred to the Global Data Warehouse 201, the Cost Savings Documentation (CSD) system 103 produces Cost Savings Summary Reports (CSSR) 305, Cost Savings Detail Reports (CSDR) 307, as well as Customer Savings Documents 701.

An Example of the Upload Template 707 is provided as follows:

| CSD Default Override Upload Sheet | | | | | |
|---|---|---|---|---|---|
| NA Pgm Name | | Bill To # | 123189 | GOV Pgm Name | |
| State Program Name | | Location ID # | | | |
| Default Info: Location ID or SPMR Name | | | | | |
| Definition and Values | | | | Default | Actual |
| Labor Rates | Hourly Wage - Office Staff (Purchasing, Purchasing Mgr.) | | | $28.00 | |
| | Hourly Wage - Labor Rate (Maintenance, Engineering) | | | $25.00 | |
| | Hourly Wage - Shop Rate (Machinist, Operators and Assemblers) | | | $32.00 | |
| | Benefits as a % of Hourly Wage | | | 25% | |
| Value Range | | Low | Medium | High | |
| Purchase Order Costs | | $19 | $53 | $97 | $53 |
| Cost of Capital | | 9% | 9.5% | 10.14% | 9.50% |
| Procurement Cards % of Savings | | 40% | 80% | 94% | 80% |

-continued

| CSD Default Override Upload Sheet | | | | |
|---|---|---|---|---|
| E-Procurement Improvement % over manual process | 35% | 55% | 75% | 55% |
| Average minutes saved per web transaction? | | | | 5 |
| MSC Sourcing saves the customer how much time per event? (minutes) | | | | 15 |
| PO Reduction     PO Reduction from manual process to mscdirect.com | | | | 20% |
| %                         PO Reduction from manual process to E-Procurement | | | | 20% |
|                              PO Reduction from manual process to P-Card | | | | 20% |
| VENDING Hours of MSC Re-Stock Labor provided per week? | | | | 0 |

| Cumulatative Data: Bill to | | |
|---|---|---|
| MSC Resources Provided to the Customer in Hours | Web/E-Procurement Training | 10 |
| | Specialized Product Training | |
| | Safety Training | |
| | Business Needs Analysis | |
| | Metal Working Tech Team | |
| | Implementation Team On-site | |
| | On Site Inside Sales Associate - Hrs per week | |

Cumulative Data: Bill to
Optional Sections - Process, Pricing, Energy and Water

| Process Savings | | | |
|---|---|---|---|
| Item Number | Price (New vs Old) | | Usage (New vs Old) | |
| | New #1 | Old #1 | New #1 | Old #1 |
| | New #2 | Old #2 | New #2 | Old #2 |
| | New #3 | Old #3 | New #3 | Old #3 |
| | New #4 | Old #4 | New #4 | Old #4 |
| | | Competitor Pricing | | |
| Competitor Number | Comp Price | MSC Number | MSC Price | QTY |
| | | Energy and Water Savings | | |
| | $ Savings Amount | | Type | |
| | Emal this form to MSCCSD@mscdirect.com | | | |

FIG. 8 is a data diagram of upload data 801 for the Global Data Warehouse and the various components contained therein. The data components depicted may vary based on the specific customer situation.

Figure 9:
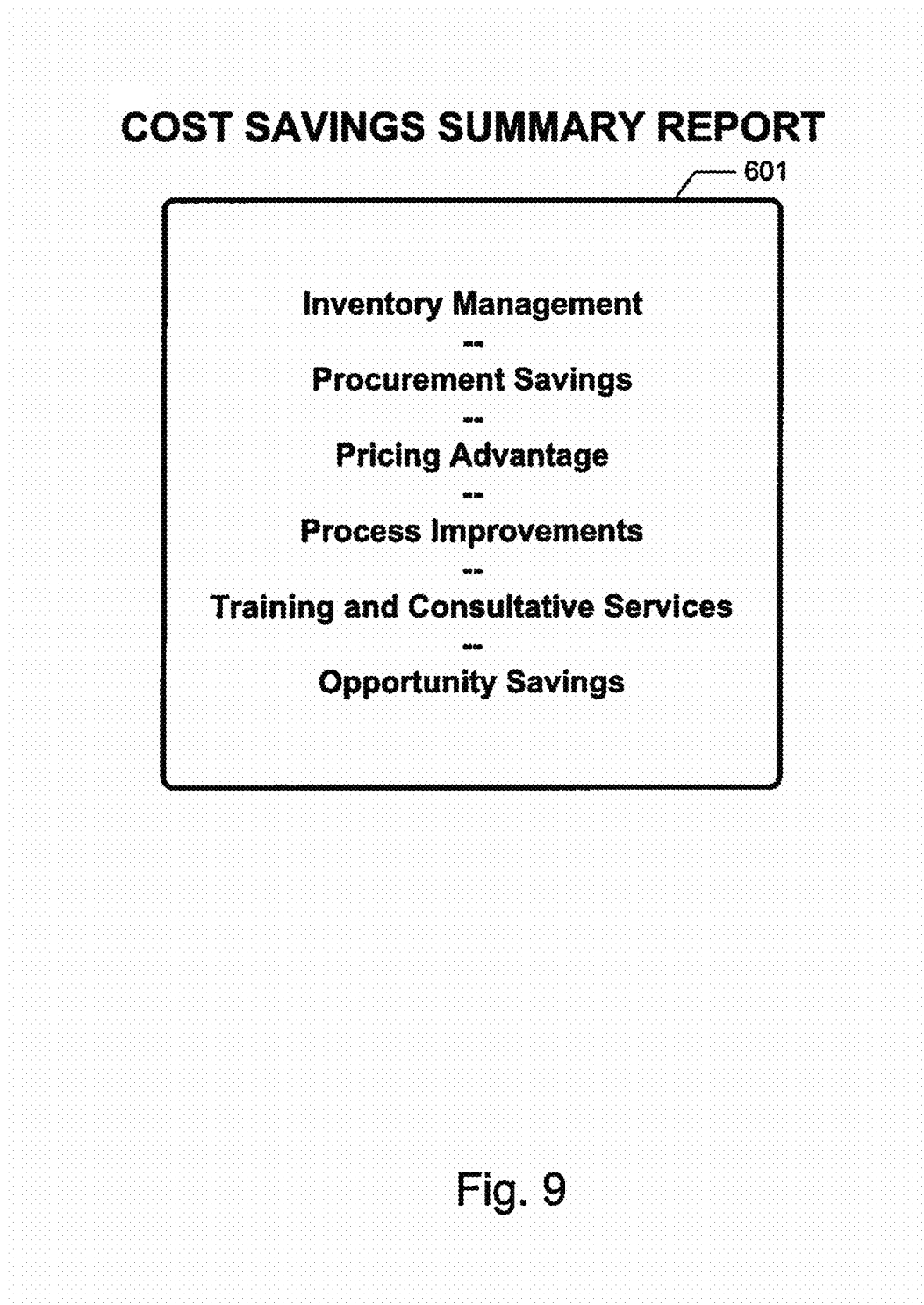
FIG. 9 depicts data elements of the Cost Savings Summary Report CSSR.

FIG. 9 depicts data elements of the Cost Savings Summary Report CSSR. Further depicted herein is a sample Cost Savings Summary Report CSSR.

Figure 10:
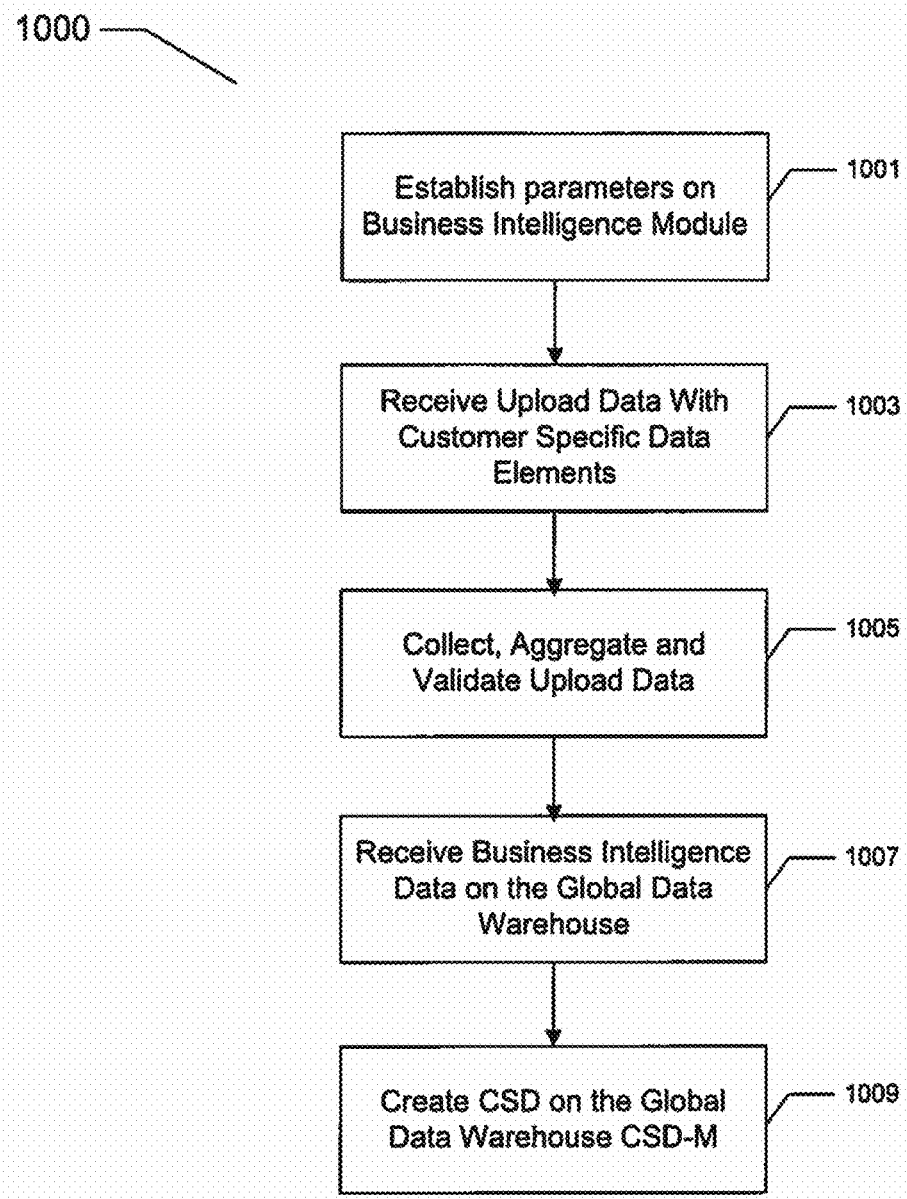
FIG. 10 is a flowchart depicting a computer based method for cost related decision making in accordance with the present invention.

FIG. 10 is a flowchart depicting a computer based method for cost related decision making in accordance with the present invention. As an initial step, parameters are established on the Business Intelligence Module in 1001. Such parameters include, for example, customer profile information. Upload data from, for example, an upload template, is then received by the Business Intelligence Module in step 1003. Upload data includes, for example, labor rates, purchase order costs, cost of capital, savings parameters, and optional parameters such as pricing, usage, energy, water, and the like. In subsequent step 1005, the upload data is collected, aggregated, and validated. Business intelligence data is then received on the global data warehouse in step 1007 and parsed to the cost savings delivery mechanism CSD-M in step 1009 for creation of cost savings documentation.

Figure 11:
FIG. 11 depicts an example of a cost savings summary report.

FIG. 11 depicts an example of a cost savings summary report produced by CSD-M and the related system elements described herein.

Figure 12:
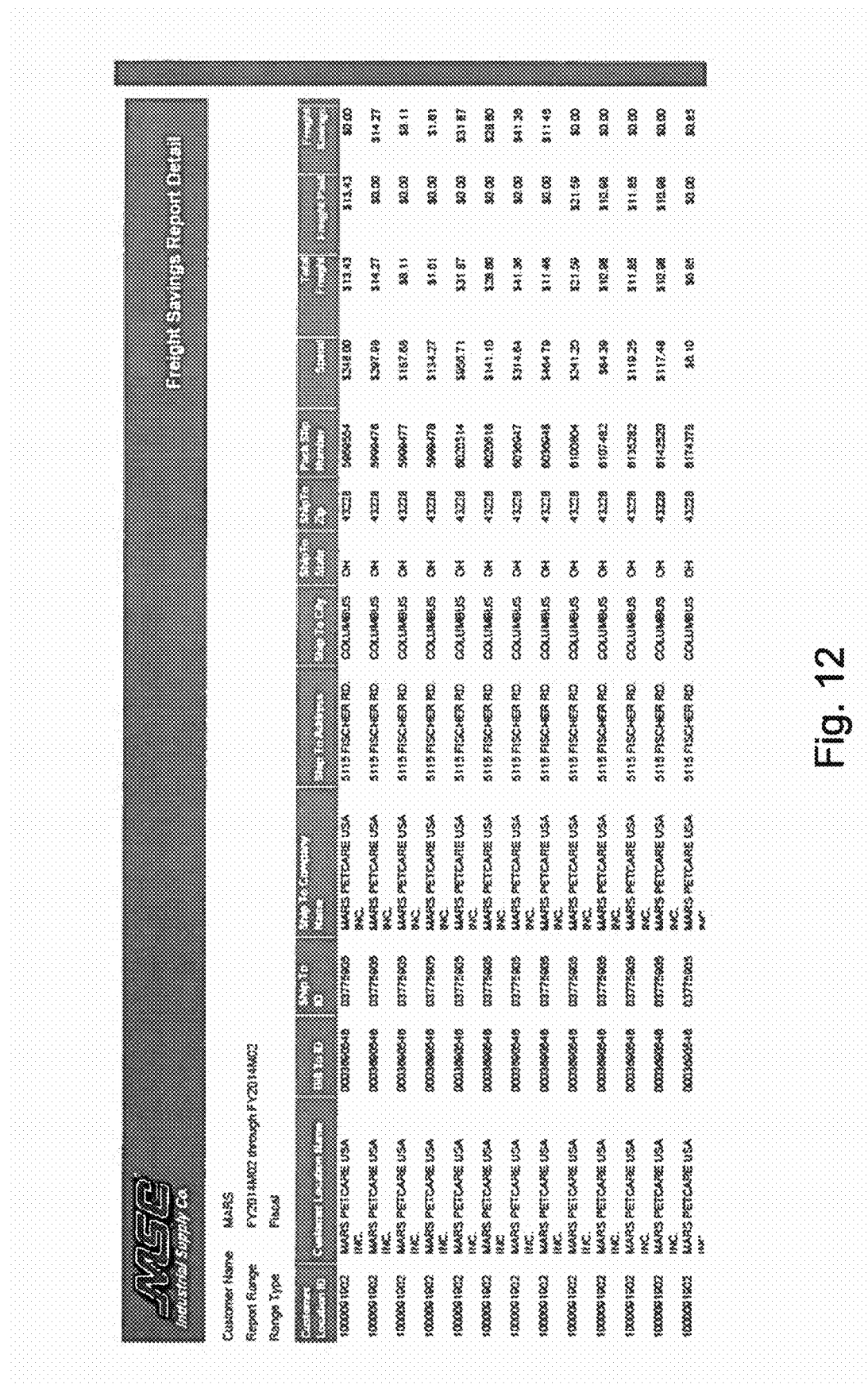

FIG. 12 depicts an example of a cost savings detail report produced by CSD-M and the related system elements described herein.

Figure 15:
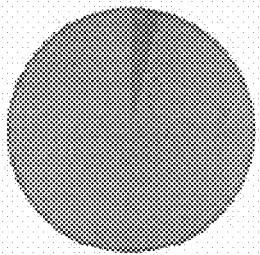
FIG. 15 depicts a screenshot of savings with pricing advantage.
Figure 20:
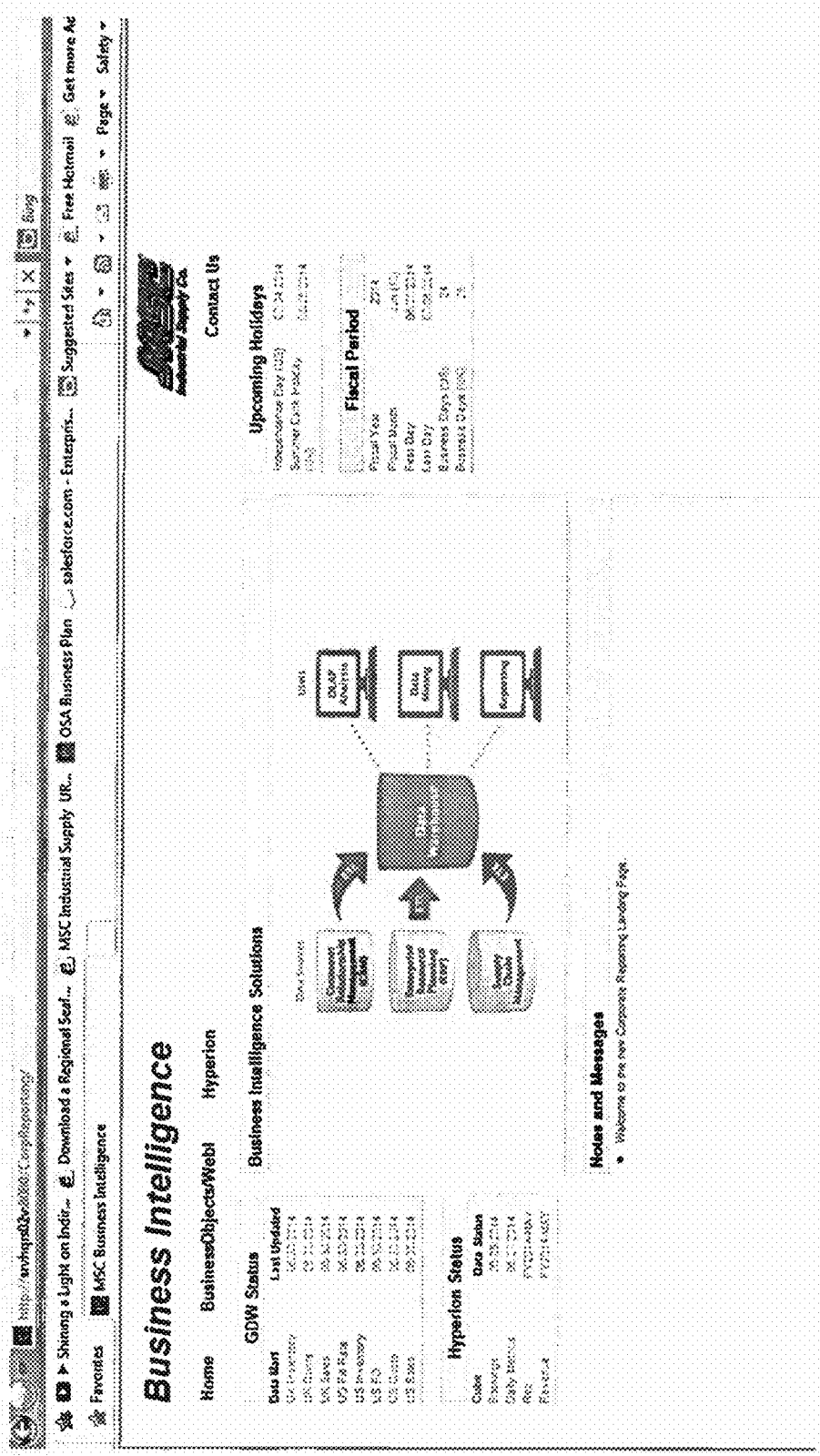
FIG. 20 depicts the report access process.
Figure 25:
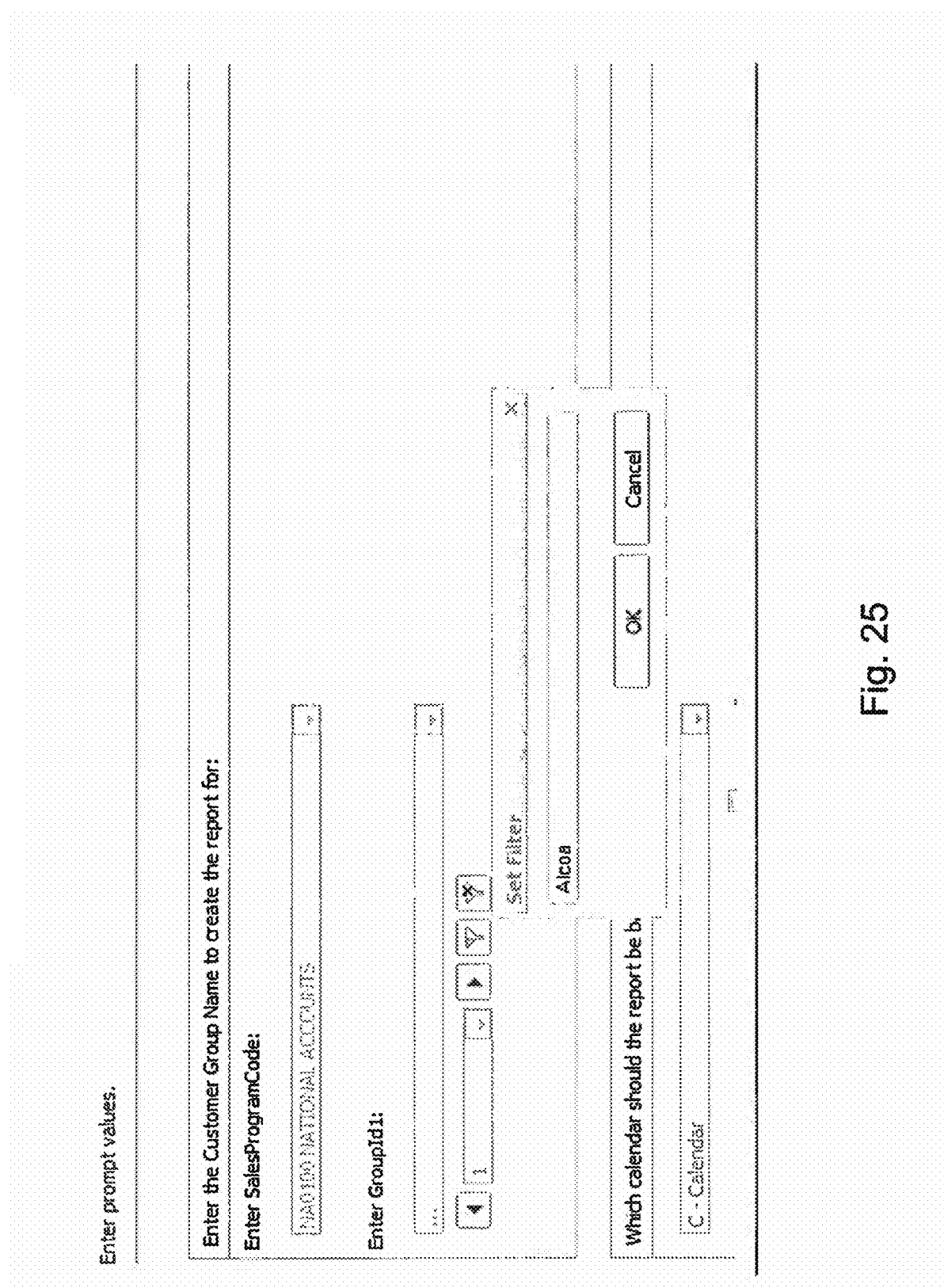
FIG. 25 depicts a screenshot of the CSDR request process for national and government accounts.
Figure 28:
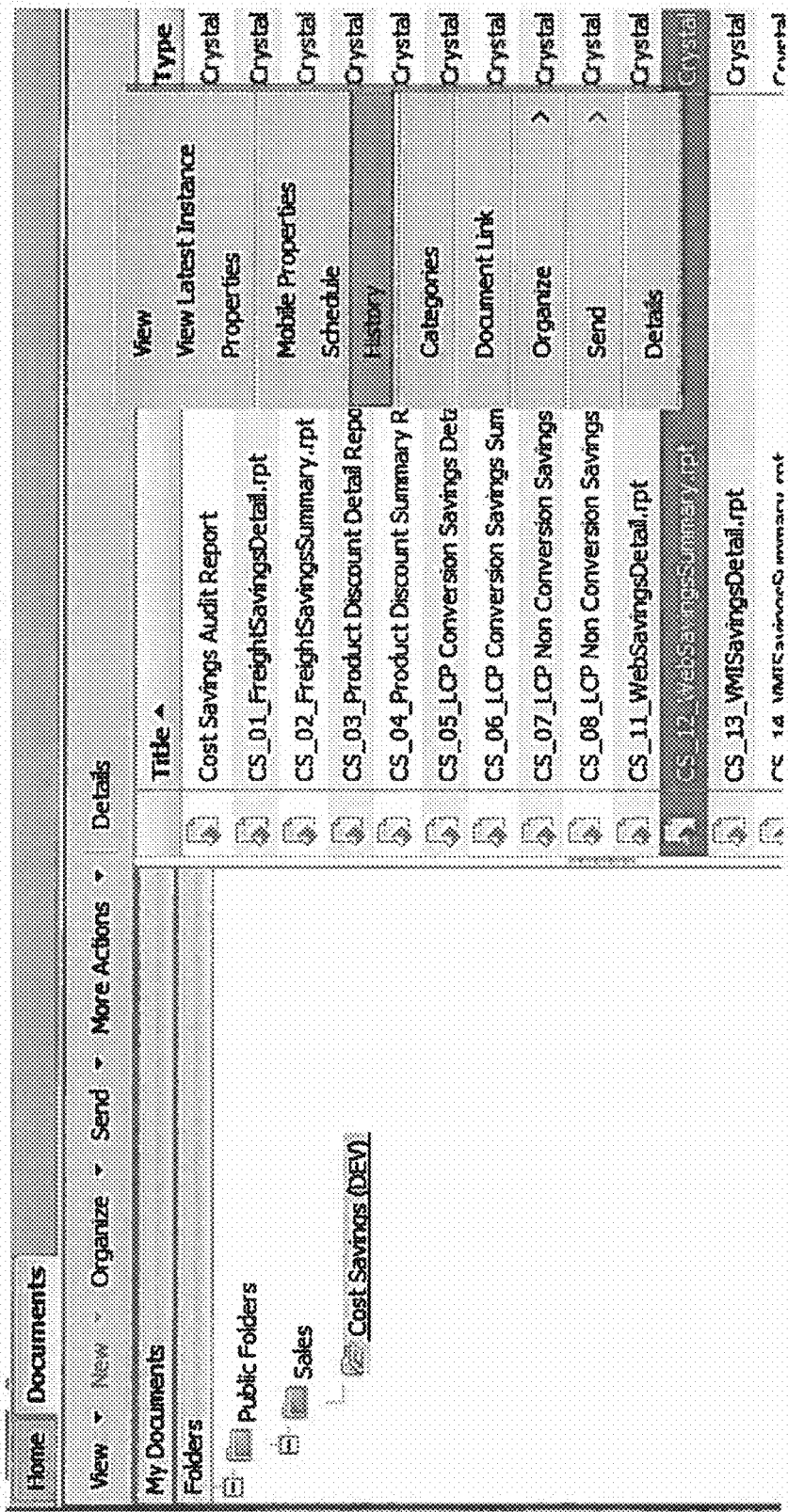
FIG. 28 depicts a screenshot of the retrieval process from history for CSDR.

FIGS. 13-28 depict exemplary screenshots of the present invention. FIG. 13 depicts a screenshot of total savings through inventory management. FIG. 14 depicts a screenshot of procurement savings. FIG. 15 depicts a screenshot of savings with pricing advantage. FIG. 16 depicts a screenshot of savings with process improvements. FIG. 17 depicts a screenshot of savings with training and consultative services. FIGS. 18 and 19 depict opportunity savings. FIG. 20 depicts the report access process. FIG. 21 depicts a screenshot of the CSD scheduler Branch/BSM view. FIG. 22 depicts a screenshot of the CSD scheduler Rep View. FIG. 23 depicts a screenshot of the request process for CSDR. FIG. 24 depicts a further screenshot of the CSDR request process. FIG. 25 depicts a screenshot of the CSDR request process for national and government accounts. FIG. 26 depicts further screenshots of the CSDR request process for national and government accounts. FIG. 27 depicts a screenshot of the retrieval process and distribution for CSDR, and FIG. 28 depicts a screenshot of the retrieval process from history for CSDR.

While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of this specification, claims, and the attached drawings.

What is claimed is:

1. A computer based system for quantifying cost savings comprising:
    a computer having a processor, memory, and access to computer readable media;
    a computer program stored on computer readable media having a business intelligence module;

upload templates stored on computer readable media for uploading customer specific data elements onto a global data warehouse;

a harvester computer program stored on computer readable media for collecting, aggregating and validating upload data contained in the upload templates and received through a network;

the global data warehouse computing system configured to receive inventory information from the business intelligence module and to create cost savings documentation with a cost savings delivery mechanism that identifies and quantifies cost savings that are realized by use of an inventory management system and potential cost saving opportunities that may be realized by use of supply chain and operational cost savings programs;

wherein the inventory information comprises output data from a system for ordering supplies; and a system for ordering of supplies comprising:

a portable barcode scanner configured to output data according to at least one of an HID, CDC or SPP protocol, the output data reflecting results of scanning a barcode;

a mobile phone device, physically removed from the portable barcode scanner, having an input port through which an external device can provide data to the mobile phone for processing, the mobile phone device being incapable of recognizing and parsing data, received via the input port, when the data is configured according to the HID, CDC or SPP protocol;

a communication connection connecting the mobile phone device and the portable barcode scanner to each other via the input port;

a scanner adapter application, operating on the mobile phone device, which receives the output data from the portable barcode scanner via the input port, the output data comprising order data relating to a supply item stocked in a bin and configured according to one of the HID, CDC or SPP protocols, the scanner adapter application being configured to parse the order data and pass the order data to an upload application operating on the mobile phone device, the upload application having a current data field that receives at least part of the order data;

a listener server configured to receive order information including the at least part of the order data, from the upload application on the mobile phone device, receive and compile the order information as at least one order batch whereas each order batch is a data structure containing scanned barcodes, convert the at least one order batch into an electronic supply order, store the at least one order batch in a data repository associated with the listener server, and send the electronic supply order to a vendor server;

the listener server further being configured to automatically create an electronic supply order for one or more batches containing scanned barcodes on the vendor server, and an interface through which the mobile phone device can connect to the listener server via a network.

2. The system of claim 1, wherein the cost savings documentation includes a labor savings element that results from use of the supply chain and operational cost savings programs.

3. The system of claim 1, wherein the cost savings documentation includes a purchase order cost reduction element that results from use of the supply chain and operational cost savings programs.

4. The system of claim 1, wherein the cost savings documentation includes an inventory reduction cost savings element that results from use of the supply chain and operational cost savings programs.

5. The system of claim 1, wherein the cost savings documentation includes a stock out savings element that results from use of the supply chain and operational cost savings programs.

6. The system of claim 1, wherein the cost savings documentation includes a put away cost reduction savings element that results from use of the supply chain and operational cost savings programs.

7. The system of claim 1, wherein the cost savings documentation includes a cost savings summary report.

8. The system of claim 7, wherein the cost savings summary report includes an inventory management category.

9. The system of claim 7, wherein the cost savings summary report includes a procurement savings category.

10. The system of claim 7, wherein the cost savings summary report includes a pricing advantage category.

11. The system of claim 7, wherein the cost savings summary report includes a process improvements category.

12. The system of claim 7, wherein the cost savings summary report includes a training and consultative services category.

13. The system of claim 7, wherein the cost savings summary report includes an opportunity savings category.

14. The system of claim 1, wherein the cost information contained in the upload data is received from another computer.

15. The system of claim 1, further comprising a computer network connecting the business intelligence module with the global data warehouse computing system.

16. The system of claim 1, wherein the upload data comprises labor rates to replace or supplement default information contained in the global data warehouse.

17. The system of claim 1, wherein the upload data comprises purchase order costs to replace or supplement default information contained in the global data warehouse.

18. The system of claim 1, wherein the upload data comprises cost of capital figures to replace or supplement default information contained in the global data warehouse.

19. The system of claim 1, wherein the upload data comprises procurement card percent of savings figures to replace or supplement default information contained in the global data warehouse.

20. The system of claim 1, wherein the upload data comprises e-procurement improvement percentages over manual processes to replace or supplement default information contained in the global data warehouse.

21. The system of claim 1, wherein the upload data comprises average minutes saved per web transaction figures to replace or supplement default information contained in the global data warehouse.

22. The system of claim 1, wherein the upload data comprises outside sourcing savings per event figures to replace or supplement default information contained in the global data warehouse.

23. The system of claim 1, wherein the upload data comprises purchase order reduction percentages figures to replace or supplement default information contained in the global data warehouse.

24. The system of claim 1, wherein the upload data comprises vending hours of re-stock labor figures to replace or supplement default information contained in the global data warehouse.

25. The system of claim 1, wherein the upload data comprises outside resources provided figures.

26. The system of claim 1, wherein the upload data comprises process savings figures.

27. The system of claim 1, wherein the upload data comprises competitor pricing figures.

28. The system of claim 1, wherein the upload data comprises energy savings figures.

29. The system of claim 1, wherein the upload data comprises water savings figures.

30. A computer based method for cost related decision making comprising the steps of:
 establishing on a business intelligence module residing on a computer transactional, pricing and program information;
 receiving on a computer upload templates containing customer specific data elements for uploading to a global data warehouse;
 collecting, aggregating and validating using a harvester computer program stored on a computer upload data contained in the upload templates;
 providing on a business intelligence module inventory information to a global data warehouse computing system;
 creating on a cost savings delivery mechanism on the global data warehouse computing system cost savings documentation that identifies cost savings realized by use of an inventory management system and potential cost saving opportunities that may be realized by use of supply chain and operational cost savings programs;
 wherein the inventory information comprises output data from a system for ordering of supplies; and
 wherein the system for ordering of supplies comprises:
  a portable barcode scanner configured to output data according to at least one of an HID, CDC or SPP protocol, the output data reflecting results of scanning a barcode;
  a mobile phone device, physically removed from the portable barcode scanner, having an input port through which an external device can provide data to the mobile phone for processing, the mobile phone device being incapable of recognizing and parsing data, received via the input port, when the data is configured according to the HID, CDC or SPP protocol;
  a communication connection connecting the mobile phone device and the portable barcode scanner to each other via the input port;
  a scanner adapter application, operating on the mobile phone device, which receives the output data from the portable barcode scanner via the input port, the output data comprising order data relating to a supply item stocked in a bin and configured according to one of the HID, CDC or SPP protocols, the scanner adapter application being configured to parse the order data and pass the order data to an upload application operating on the mobile phone device, the upload application having a current data field that receives at least part of the order data;
  a listener server configured to receive order information including the at least part of the order data, from the upload application on the mobile phone device, receive and compile the order information as at least one order batch whereas each order batch is a data structure containing scanned barcodes, convert the at least one order batch into an electronic supply order, store the at least one order batch in a data repository associated with the listener server, and send the electronic supply order to a vendor server;
  the listener server further being configured to automatically create an electronic supply order for one or more batches containing scanned barcodes on the vendor server; and
  an interface through which the mobile phone device can connect to the listener server via a network.

* * * * *